United States Patent
Lee et al.

(10) Patent No.: US 10,732,792 B2
(45) Date of Patent: Aug. 4, 2020

(54) IMAGE DISPLAY APPARATUS AND METHOD FOR CHANGING PROPERTIES OF A HIGHLIGHTED ITEM AND SURROUNDING ITEMS

(71) Applicant: SAMSUNG ELECTRONICS CO., LTD., Suwon-si (KR)

(72) Inventors: Jin-ha Lee, Seoul (KR); Tae-kwan Lee, Seoul (KR); Sang-joon Lee, Dangjin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 14/987,886

(22) Filed: Jan. 5, 2016

(65) Prior Publication Data

US 2016/0196018 A1 Jul. 7, 2016

(30) Foreign Application Priority Data

Jan. 5, 2015 (KR) ........................ 10-2015-0000866

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0346* (2013.01); *G06F 3/03547* (2013.01); *G06F 3/04812* (2013.01); *G06F 3/04842* (2013.01); *G06F 3/04847* (2013.01); *H04N 5/4403* (2013.01); *H04N 21/4312* (2013.01); *H04N 21/4821* (2013.01); *G06F 2203/0384* (2013.01);
(Continued)

(58) Field of Classification Search
CPC .............. G06F 3/0482; G06F 3/04842; H04N 21/4312; H04N 21/4821
See application file for complete search history.

(56) References Cited

U.S. PATENT DOCUMENTS 5,565,888 A * 10/1996 Selker ................. G06F 3/04842
345/157
5,805,165 A  9/1998 Thorne, III et al.
(Continued)

FOREIGN PATENT DOCUMENTS

CN   103813209 A   5/2014
WO   2014040490 A1   3/2014

OTHER PUBLICATIONS

Freebiesbug.com, "Simple icon hover effects CSS," May 31, 2013, Available https://freebiesbug.com/code-stuff/simple-icon-hover-effects-css/ (Year: 2013).*

(Continued)

*Primary Examiner* — Alvin H Tan
(74) *Attorney, Agent, or Firm* — Sughrue Mion, PLLC

(57) ABSTRACT

An image display method includes displaying, on a display, an item list that includes items and a cursor that indicates a location of a user input on the display, detecting movement of the user input for moving the cursor; and moving the cursor in response to the detected movement and changing properties of an item among the items according to an overlapping extent of a first virtual area that is set with respect to the cursor and a second virtual area that is set with respect to the item.

29 Claims, 30 Drawing Sheets

(51) Int. Cl.
  *G06F 3/0346*   (2013.01)
  *G06F 3/0354*   (2013.01)
  *H04N 5/44*     (2011.01)
  *H04N 21/482*   (2011.01)
  *G06F 3/0484*   (2013.01)
  *H04N 21/431*   (2011.01)
  *H04N 21/422*   (2011.01)

(52) U.S. Cl.
  CPC ... *H04N 21/42222* (2013.01); *H04N 21/4318* (2013.01)

(56) References Cited

U.S. PATENT DOCUMENTS

| | | | |
|---|---|---|---|
| 6,954,899 B1 | 10/2005 | Anderson | |
| 7,614,018 B1* | 11/2009 | Ohazama | G06F 3/0482 |
| | | | 715/815 |
| 8,159,469 B2* | 4/2012 | Shiplacoff | G06F 3/0416 |
| | | | 345/156 |
| 8,726,194 B2* | 5/2014 | Hildreth | G06F 3/011 |
| | | | 715/772 |
| 8,793,606 B2* | 7/2014 | Kim | G06F 3/04817 |
| | | | 345/173 |
| 9,015,634 B2* | 4/2015 | Shin | G06F 3/0482 |
| | | | 715/853 |
| 9,182,900 B2* | 11/2015 | Choi | G06F 3/0488 |
| 9,467,732 B2 | 10/2016 | Kim et al. | |
| 2005/0071864 A1 | 3/2005 | Denoue et al. | |
| 2007/0085825 A1 | 4/2007 | Geffen et al. | |
| 2008/0222558 A1 | 9/2008 | Cho et al. | |
| 2009/0031240 A1 | 1/2009 | Hildreth | |
| 2012/0192110 A1 | 7/2012 | Wu | |
| 2013/0125066 A1* | 5/2013 | Klein | G06F 3/04812 |
| | | | 715/862 |
| 2013/0212534 A1* | 8/2013 | Knight | G06F 3/04817 |
| | | | 715/838 |
| 2015/0228100 A1 | 8/2015 | Xun et al. | |

OTHER PUBLICATIONS

Screenshots of demo from Freebiesbug.com, Demo posted on May 31, 2013, Demo available https://tympanus.net/Development/IconHoverEffects/#set-7 (Year: 2013).*

International Search Report dated Mar. 4, 2016 issued by the International Searching Authority in counterpart International Application No. PCT/KR2015/012857 (PCT/ISA/220/210).

Written Opinion dated Mar. 4, 2016 issued by the International Searching Authority in counterpart International Application No. PCT/KR2015/012857 (PCT/ISA/237).

Communication dated May 9, 2016 issued by the European Patent Office in counterpart European Patent Application No. 16150155.6.

"Codecanyon.net—Icon Hover Effects", YouTube, Nov. 19, 2014, retrieved from the Internet: URL:https://www.youtube.com/watch?v=eyq4hTyQAx8. (1 page total).

Communicatio dated Apr. 10, 2018 by the State Intellectual Property Office of P.R. China in counterpart Chinese Patent Application No. 201610006873.2.

Communication dated Apr. 23, 2018 by the European Patent Office in counterpart European Patent Application No. 16150155.6.

Office Action dated Jan. 3, 2019 by the State Intellectual Property Office of P.R. China in counterpart Chinese Patent Application No. 201610006873.2.

"Sneak Peak", Design Shack, https://designshack.net/articles/css/joshua johnson-2, Aug. 16, 2013. (17 pages total).

* cited by examiner

IMAGE DISPLAY APPARATUS AND METHOD FOR CHANGING PROPERTIES OF A HIGHLIGHTED ITEM AND SURROUNDING ITEMS

CROSS-REFERENCE TO RELATED APPLICATION

This application claims priority from Korean Patent Application No. 10-2015-0000866, filed on Jan. 5, 2015, in the Korean Intellectual Property Office, the disclosure of which is incorporated herein in its entirety by reference.

BACKGROUND

1. Field

One or more exemplary embodiments relate to an image display apparatus and method, and more particularly, to an image display apparatus and method which display an image by changing properties of a highlighted item and items near the highlighted item from an item list that includes a plurality of items.

2. Description of the Related Art

Image display apparatuses display images that users may view. The users may watch broadcasts via the image display apparatuses. The image display apparatuses display broadcasts selected by the users from among broadcasting signals that are transmitted from broadcasting stations. Currently, it is a worldwide trend to convert from analog broadcasting to digital broadcasting.

Digital broadcasting is a broadcasting technology of transmitting digital images and audio signals. Compared to analog broadcasting, digital broadcasting is more resilient to external noise and thus has less data loss, is more convenient in terms of error correction, and provides higher resolution and more vivid images. Also, unlike analog broadcasting, digital broadcasting may provide interactive services.

Recently, smart televisions (TVs) have been developed which provide not only digital broadcasting but also various types of content. Smart TVs are not manually operated by the users, but analyze the user's needs without user manipulation and provide desired content.

SUMMARY

One or more exemplary embodiments provide an image display apparatus and method of gradually changing properties of items in an item list according to a location relationship between the items and a cursor.

Additional aspects will be set forth in part in the description which follows and, in part, will be apparent from the description, or may be learned by practice of the presented exemplary embodiments.

According to an aspect of an exemplary embodiment, an image display method includes displaying, on a display, an item list that includes items and a cursor that indicates a location of a user input on the display, detecting movement of the user input for moving the cursor, and moving the cursor in response to the detected movement and changing properties of an item among the items according to an overlapping extent of a first virtual area that is set with respect to the cursor and a second virtual area that is set with respect to the item.

The changing of the properties of the item may include gradually changing the properties of the item according to the overlapping extent of the first virtual area that is set with respect to the cursor and the second virtual area that is set with respect to the item from among the plurality of items.

The first virtual area may be determined based on respective sizes of virtual areas that are set with respect to the items.

The second virtual area may be determined based on a size of the item.

The first and second virtual areas may be circular or oval-shaped.

The changing of the properties of the item may include at least one selected from changing a size of the item, increasing a size of content displayed on the item, decreasing the size of the content displayed on the item, and changing an opacity of the content displayed on the item.

The changing of the properties of the item may include maximizing content displayed on the item when the cursor is located at a center of the item, and gradually decreasing a size of the content as the cursor is moved away from the center of the item.

The changing of the properties of the item may include maximizing a size of first content displayed on a first item among the items when the cursor is located at a center of the first item, gradually decreasing the size of the first content and gradually increasing a size of second content displayed on a second item among the items, the second item being adjacent to the first item, as the cursor is moved from the center of the first item to a center of the second item, and maximizing the size of the second content when the cursor is located at the center of the second item.

The changing of the properties of the item may include maximizing an opacity of an image displayed on the item when the cursor is located at a center of the item, and gradually decreasing the opacity of the image as the cursor is moved away from the center.

The changing of the properties of the item may include maximizing an opacity of a first image displayed on a first item among the plurality of items when the cursor is located at a center of the first item, gradually decreasing the opacity of the first image and increasing an opacity of a second image displayed on a second item among the items, the second item being adjacent to the first item, as the cursor is moved from the center of the first item to a center of the second item, and maximizing the opacity of the second image when the cursor is located at the center of the second item.

The changing of the properties of the item may include minimizing a size of the item when the cursor is located at a center of the item, and gradually increasing the size of the item as the cursor is moved away from the center of the item.

The changing of the properties of the item may include changing a size of a first item among the items to a first minimum size when the cursor is located at a center of the first item, gradually increasing the size of the first item and decreasing a size of a second item that is adjacent to the first item as the cursor is moved from the center of the first item to a center of the second item, and changing the size of the second item to a second minimum size when the cursor is located at the center of the second item.

According to an aspect of another exemplary embodiment, an image display method includes displaying, on a display, an item list that includes items and a cursor that indicates a location of a user input on the display, detecting movement of the user input for moving the cursor, and moving the cursor in response to the detected movement and changing properties of a first item at which the cursor is located, among the items, according to a location of the cursor in the first item.

The changing of the properties of the first item may include at least one selected from changing a size of the first item, increasing a size of content displayed on the first item, decreasing the size of the content displayed on the first item, and changing an opacity of the content displayed on the first item.

The changing of the properties of the first item may include gradually changing the properties of the first item based on a ratio between a size of a virtual area that is set based on the location of the cursor and a size of the first item.

The third virtual area and the first item may be similarly shaped.

The changing of the properties of the first item may include increasing a size of content displayed on the first item as the ratio decreases, and decreasing the size of the content displayed on the first item as the ratio increases.

According to an aspect of another exemplary embodiment, an image display apparatus includes a sensor configured to communicate with a display configured to display an item list that includes items and a cursor that indicates a location of a user input, and detect a user input for moving the cursor, and a controller configured to move the cursor in response to the user input and change properties of an item among the items according to an overlapping extent of a first virtual area that is set with respect to the cursor and a second virtual area that is set with respect to the item.

The controller may gradually change the properties of the item according to the overlapping extent of the first virtual area that is set with respect to the cursor and the second virtual area that is set with respect to the item from among the items.

The controller may be configured to perform at least one selected from changing a size of the item, increasing a size of content displayed on the item, decreasing the size of the content displayed on the item, and changing an opacity of the content displayed on the item.

The controller may be configured to maximize content displayed on the item when the cursor is located at a center of the item, and gradually decrease a size of the content as the cursor is moved away from the center of the item.

The controller may be configured to maximize a size of first content displayed on a first item among the items when the cursor is located at a center of the first item, gradually decrease the size of the first content and gradually increase a size of second content displayed on a second item that is adjacent to the first item as the cursor is moved from the center of the first item to a center of the second item, and maximize the size of the second content when the cursor is located at the center of the second item.

The controller may be configured to maximize an opacity of an image displayed on the item when the cursor is located at a center of the item, and gradually decrease the opacity of the image as the cursor is moved away from the center.

The controller may be configured to maximize an opacity of a first image displayed on a first item among the items when the cursor is located at a center of the first item, gradually decrease the opacity of the first image and increase an opacity of a second image displayed on a second item that is adjacent to the first item as the cursor is moved from the center of the first item to a center of the second item, and maximize the opacity of the second image when the cursor is located at the center of the second item.

The controller may be configured to minimize a size of the item when the cursor is located at a center of the item, and gradually increase the size of the item as the cursor is moved away from the center of the item.

The controller may be configured to change a size of a first item among the items to a first minimum size when the cursor is located at a center of the first item, gradually increase the size of the first item and decrease a size of a second item that is adjacent to the first item as the cursor is moved from the center of the first item to a center of the second item, and change the size of the second item to a second minimum size when the cursor is located at the center of the second item.

According to an aspect of another exemplary embodiment, an image display apparatus includes a sensor configured to communicate with a display configured to display an item list that includes items and a cursor that indicates a location of a user input, and to detect movement of the a user input for moving the cursor, and a controller configured to move the cursor in response to the user input and change properties of a first item at which the cursor is located, among the items, according to a location of the cursor in the first item.

The controller may be configured to perform at least one selected from changing a size of the first item, increasing a size of content displayed on the first item, decreasing the size of the content displayed on the first item; and changing an opacity of the content displayed on the first item.

The controller may be configured to gradually change the properties of the first item based on a ratio between a size of a virtual area that is set based on the location of the cursor and a size of the first item.

The virtual area and the first item may be similarly shaped.

The controller may be configured to increase a size of content displayed on the first item as the ratio decreases, and decrease the size of the content displayed on the first item as the ratio increases.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
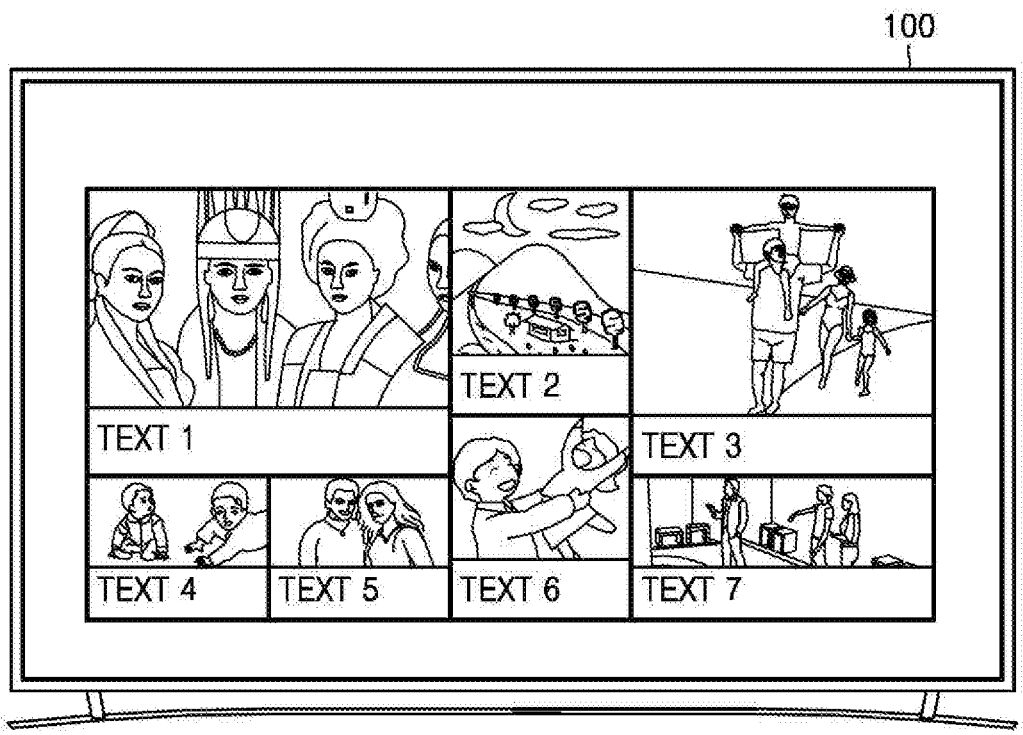
FIG. 1 is a diagram of an image display apparatus and a controller according to an exemplary embodiment.
Figure 1:
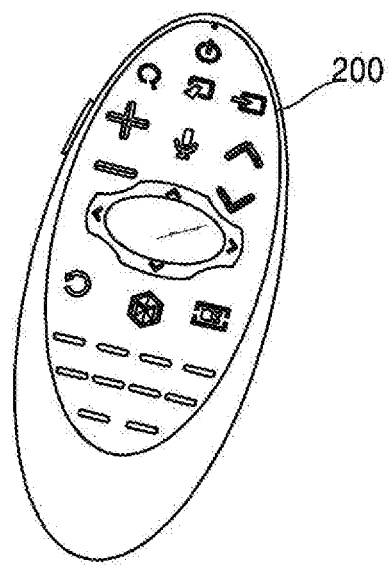

Terms used in the description of exemplary embodiments will be briefly described, and exemplary embodiments will be described in detail.

The terms used in the exemplary embodiments are selected as general terms currently used as widely as possible, but in specific cases, terms arbitrarily selected by the applicant are also used, and in such cases the meanings are mentioned in the corresponding detailed description section, so the exemplary embodiments should be understood not by literal meanings of the terms but by given meanings of the terms.

It will be further understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Hereinafter, one or more exemplary embodiments will now be described more fully with reference to the accompanying drawings so that this disclosure will be thorough and complete, and will fully convey the exemplary embodiments to one of ordinary skill in the art. The exemplary embodiments may, however, be embodied in many different forms and should not be construed as being limited to the exemplary embodiments set forth herein. Features that are unnecessary for clearly describing the exemplary embodiments are not included in the drawings. Also, throughout the specification, like reference numerals in the drawings denote like elements. Expressions such as "at least one of," when preceding a list of elements, modify the entire list of elements and do not modify the individual elements of the list.

FIG. 1 is a diagram of an image display apparatus 100 and a control apparatus 200 according to an exemplary embodiment.

As shown in FIG. 1, the image display apparatus 100 may be a television (TV), but is not limited thereto. The image display apparatus 100 may be an electronic device that includes a display. For example, the image display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. In particular, exemplary embodiments of the image display apparatus 100 may be easily provided in a large display apparatus such as a TV. However, the exemplary embodiments are not limited thereto. The image display apparatus 100 may be fixed or mobile, or a digital broadcast receiver.

The image display apparatus 100 may be a flat display apparatus, a curved display apparatus, or a flexible display apparatus with an adjustable curvature. An output resolution of the image display apparatus 100 may be high definition (HD), full HD, ultra HD, or higher than ultra HD.

The control apparatus 200 may be various types of devices for controlling the image display apparatus 100, such as a remote control or a mobile phone.

Also, the control apparatus 200 may control the image display apparatus 100 via infrared rays or a short distance communication method such as Bluetooth. The control apparatus 200 may control the image display apparatus 100 by using at least one selected from embedded keys (including buttons), a touchpad, a microphone (not shown) that may receive a user's voice, and a sensor (not shown) that may detect motions of the control apparatus 200.

The control apparatus 200 includes a power on/off button for turning on or off the image display apparatus 100. Also, according to a user input, the control apparatus 200 may change channels of the image display apparatus 100, adjust an audio volume of the image display apparatus 100, select a type of TV (e.g., terrestrial/television/satellite TV), or change other types of settings.

Alternatively, the control apparatus 200 may be a pointer. For example, when the control apparatus 200 receives a certain key input, the control apparatus 200 may function as a pointer.

The image display apparatus 100 may be controlled by a user input for moving the control apparatus 200 upward, downward, leftward, or rightward, or tilting the control apparatus 200 in any random direction. Motion information of the control apparatus 200 which is detected via the sensor of the control apparatus 200 may be transmitted to the image display apparatus 100. The image display apparatus 100 may calculate coordinates of a cursor on a display based on the motion information of the control apparatus 200, and move the cursor with respect to the calculated coordinates. Accordingly, the cursor on the display of the image display apparatus 100 may be moved or various menus displayed on the display of the image display apparatus 100 may be activated.

When the control apparatus 200 includes a touchpad, according to a displacement value of a subject moving on the touchpad, for example, a user's finger, the cursor on the display of the image display apparatus 100 may be moved or various menus displayed on the display of the image display apparatus 100 may be selectively activated.

According to exemplary embodiments, the term "user" refers to a person controlling functions or operations of the image display apparatus 100 by using the control apparatus 200. The user may include a viewer, a manager, or an installation professional, although is not limited thereto.

According to an exemplary embodiment, the image display apparatus 100 may display a cursor that indicates an item list including a plurality of items and a location of a user input on the display.

Also, the image display apparatus 100 may move the cursor in response to an input received by the control apparatus 200, and gradually change properties of at least one item from among a plurality of items based on a location relationship between the at least one item and the cursor.

Figure 2:
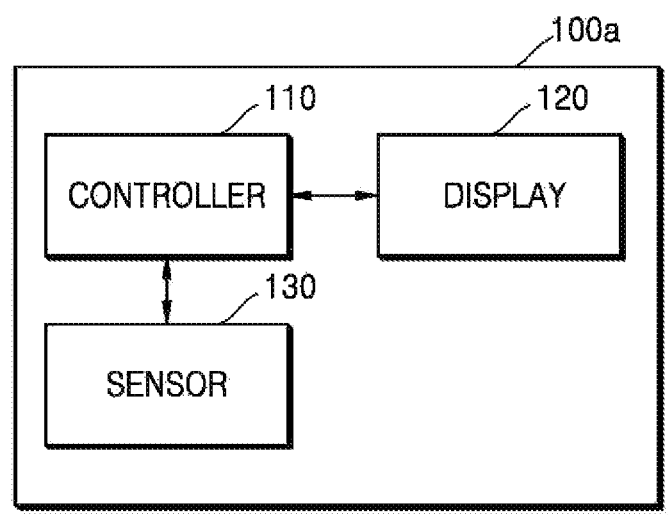
FIG. 2 is a block diagram of an image display apparatus according to an exemplary embodiment.

FIG. 2 is a block diagram of an image display apparatus 100*a* according to an exemplary embodiment. The image display apparatus 100*a* of FIG. 2 may be an exemplary embodiment of the image display apparatus 100 of FIG. 1.

Referring to FIG. 2, the image display apparatus 100*a* according to an exemplary embodiment may include a controller 110, a display 120, and a sensor 130.

The display 120 may generate a driving signal by converting an image signal, a data signal, an on-screen display (OSD) signal, and a control signal that are processed by the controller 110. The display 120 may be a plasma display panel (PDP), a liquid-crystal display (LCD), an organic light-emitting device (OLED) display, a flexible display, or a 3-dimensional (3D) display. Alternatively, the display 120 may be provided as a touch screen and function as an output device as well as an input device.

According to an exemplary embodiment, the display 120 may display an item list that includes a plurality of items. Also, the display 120 may display a cursor that indicates a location of a user input on the display 120.

The sensor 130 according to an exemplary embodiment may detect a user input and transmit the detected user input to the controller 110. Examples of the user input detected by the sensor 130 include turning power on or off, selecting channels, raising and lowering channels, and setting a screen. Also, the sensor 130 may detect a user input for moving the cursor displayed on the display 120.

The controller 110 according to an exemplary embodiment may process an image signal and input the processed image signal to the display 120. Accordingly, an image corresponding to the processed image signal may be displayed on the display 120. Also, the controller 110 may control the image display apparatus 100*a* via a user command detected by the sensor 130 or an internal program.

According to an exemplary embodiment, the controller 110 may move the cursor displayed on the display 120 in response to the detected user input. Also, the controller 110 may change properties of an item according to an exemplary embodiment based on an overlapping extent of a virtual area set with respect to the item and a virtual area set with respect to the cursor.

Based on the overlapping extent of the virtual area of the item and the virtual area of the cursor, the controller 110 may gradually change the properties of the item. The controller 110 may change a size of the item, increase or decrease a size of content displayed on the item, and change an opacity of the content displayed on the item.

When the cursor is located at the center of the item, the controller 110 may maximize a size of the content displayed on the item. When the cursor is moved away from the center of the item, the controller 110 may gradually decrease the size of the content displayed on the item.

When the cursor is located at the center of a first item, the controller 110 may maximize a size of content displayed on the first item. When the cursor is moved from the center of the first item to the center of a second item that is adjacent to the first item, the controller 110 may gradually decrease the size of the content displayed on the first item and gradually enlarge content displayed on the second item. When the cursor is located at the center of the second item, the controller 110 may maximize a size of the content displayed on the second item.

When the cursor is located at the center of the item, the controller 110 may maximize an opacity of the content displayed on the item, and when the cursor is moved away from the center of the item, the controller 110 may gradually decrease the opacity of the content displayed on the item.

When the cursor is located at the center of a first item from among a plurality of items, the controller 110 may maximize an opacity of content displayed on the first item. When the cursor is moved from the center of the first item to the center of a second item that is adjacent to the first item, the controller 110 may gradually decrease the opacity of the content displayed on the first item and gradually increase an opacity of content displayed on the second item. When the cursor is located at the center of the second item, the controller 110 may maximize the opacity of the content displayed on the second item.

When the cursor is located at the center of the item, the controller 110 may minimize a size of the item, and when the cursor is moved away from the center of the item, the controller 110 may gradually increase the size of the item.

When the cursor is located at the center of the first item from among the plurality of items, the controller 110 may change a size of the first item to a first minimum size. When the cursor is moved from the center of the first item to the center of the second item that is adjacent to the first item, the controller 110 may gradually increase the size of the first item and decrease a size of the second item. When the cursor is located at the center of the second item, the controller 110 may minimize the size of the second item to a second minimum size.

According to an exemplary embodiment, the controller 110 may change properties of the first item according to a location of the cursor in the first item from among the plurality of items. The controller 110 may set a virtual area with respect to the first item based on the location of the cursor, and gradually change the properties of the first item based on a ratio between a size of the virtual area and the size of the first item.

The controller 110 may increase a size of the content displayed on the first item as the ratio between the size of the virtual area and the size of the first item decreases, and may decrease the size of the content displayed on the first item as the ratio between the size of the virtual area and the size of the first item increases.

Figure 3:
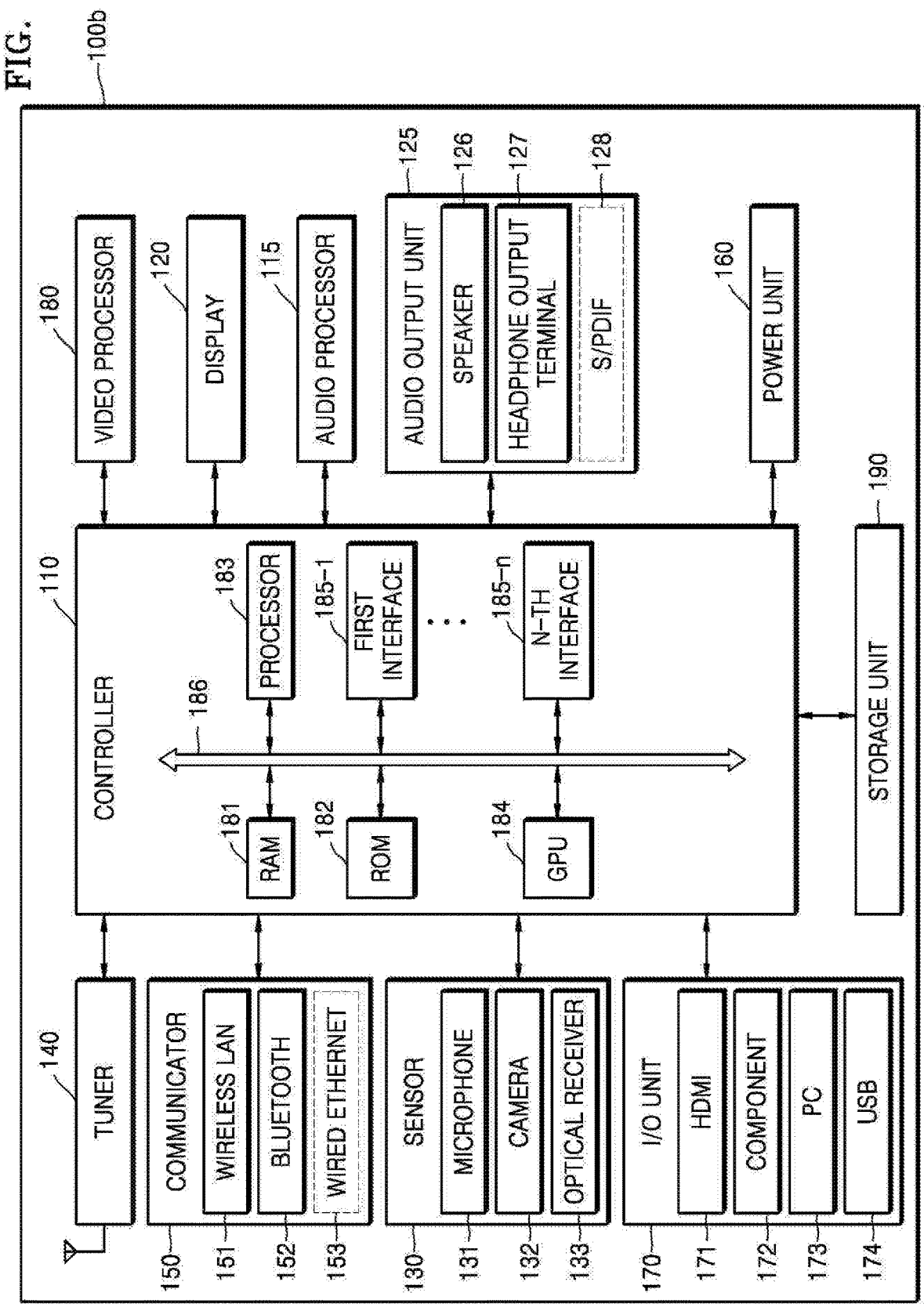
FIG. 3 is a block diagram of an image display apparatus according to an exemplary embodiment.

FIG. 3 is a block diagram of an image display apparatus 100*b* according to an exemplary embodiment. The image display apparatus 100*b* of FIG. 3 may be an exemplary embodiment of the image display apparatus 100 of FIG. 1.

Referring to FIG. 3, the image display apparatus 100*b* according to an exemplary embodiment may include not only the controller 110, the display 120, and the sensor 130, but also a video processor 180, an audio processor 115, an audio output unit 125, a power unit 160, a tuner 140, a communicator 150, an input/output (I/O) unit 170, and a storage unit 190.

With regard to the controller 110, the display 120, and the sensor 130, elements and features as described with reference to FIG. 2 will not be repeated.

The video processor 180 processes video data that is received by the image display apparatus 100*b*. The video processor 180 may perform various image processing operations on video data, such as decoding, scaling, noise filtering, and frame rate conversion.

Under the control of the controller 110, the display 120 may display a video included in a broadcast signal that is received via the tuner 140. Also, the display 120 may display content (e.g., a moving image) that is input via the communicator 150 or the I/O unit 170. The display 120 may output an image stored in the storage unit 190 under the control of the controller 110. Also, the display 120 may display an audio user interface (UI) (e.g., which includes an audio command guide) for executing an audio recognition task that corresponds to audio recognition or a motion UI (e.g., which includes a user motion guide for motion recognition) for executing a motion recognition task that corresponds to motion recognition.

The audio processor 115 processes audio data. The audio processor 115 may perform various operations on audio data, such as decoding, amplifying, and noise filtering. The audio processor 115 may include a plurality of audio processing modules for processing audio that corresponds to content.

Under the control of the controller 110, the audio output unit 125 outputs audio included in a broadcast signal that is received via the tuner 140. The audio output unit 125 may output audio (e.g., voice or sound) that is input via the communicator 150 or the I/O unit 170. Also, the audio output unit 125 may output audio stored in the storage unit 190 under the control of the controller 110. The audio output unit 125 may include at least one selected from a speaker 126, a headphone output terminal 127, a Sony/Philips digital interface (S/PDIF) output terminal 128, and a combination thereof.

Under the control of the controller 110, the power unit 160 supplies power that is input to components in the image display apparatus 100b from an external power source. Alternatively, under the control of the controller 110, the power unit 160 may supply power that is output from at least one battery (not shown) in the image display apparatus 100b to internal components.

The tuner 140 may amplify, mix, or resonate a broadcast signal that is received via wire or wirelessly, and select a frequency of a channel to be received in the image display apparatus 100b by tuning only that frequency from among a plurality of frequencies. The broadcast signal includes audio, video, and additional information (e.g., an electronic program guide (EPG)).

The tuner 140 may receive a broadcast signal in a frequency range that corresponds to a channel number (e.g., a cable channel 506) according to a user input (e.g., a control signal received from the control apparatus 200 such as a user inputting a channel number, raising or lowering channels, or selecting a channel on an EPG screen).

The tuner 140 may receive the broadcast signal from various sources such as terrestrial broadcasting, cable broadcasting, satellite broadcasting, and Internet broadcasting. The tuner 140 may receive the broadcast signal from analog broadcasting or digital broadcasting. The broadcast signal received via the tuner 140 is decoded (e.g., audio decoding, video decoding, or additional information decoding), and divided into audio, video, and/or additional information. The divided audio, video, and/or additional information may be stored in the storage unit 190 by the controller 110.

The image display apparatus 100b may include a single tuner 140 or a plurality of tuners 140. The tuner 140 and the image display apparatus 100b may be provided as an all-in-one apparatus, a separate device (e.g., a set-top box (not shown)) that includes a tuner electrically connected to the image display apparatus 100b, or a tuner (not shown) connected to the I/O unit 170.

Under the control of the controller 110, the communicator 150 may connect the image display apparatus 100b to an external device (e.g., audio device). The controller 110 may transmit and receive content to and from the external device that is connected via the communicator 150, download an application from the external device, or browse websites. The communicator 150 may include one selected from a wireless local area network (LAN) communicator 151, a Bluetooth network communicator 152, a wired Ethernet network communicator 153, or a combination thereof depending on performance and a structure of the image display apparatus 100b. The communicator 150 may receive a control signal of the controller 110 under the control of the control apparatus 200. The control signal may be a Bluetooth type, a radio frequency (RF) signal type, or a Wi-Fi type.

For example, the communicator 150 may communicate with the Bluetooth network communicator 152 and receive a signal corresponding to a Bluetooth type user input (e.g., touching, pressing, touch gesture, voice, or motion) from the control apparatus 200.

Along with the Bluetooth network communicator 152, the communicator 150 may further include other types of short distance communication devices (e.g., a near field communication (NFC) device) or a Bluetooth low energy (BLE) device (not shown).

The sensor 130 detects a voice of the user, an image of the user, or other types of interactions with the user.

A microphone 131 receives the uttered voice (e.g., spoken sounds) of the user. The microphone 131 may convert the received voice into an electric signal and output the electric signal to the controller 110. The voice of the user may include a voice command corresponding to a menu or a function of the image display apparatus 100b. A recognition range of the microphone 131 may be within a 4 m range from the microphone 131 to a location of the user, and may vary according to a volume of the voice of the user and surroundings (e.g., speaker sound and surrounding noise).

According to an exemplary embodiment, the microphone 131 may receive the uttered voice of the user and output received voice data to the controller 110 so that the controller 110 may use the voice data to identify the user that is viewing the image display apparatus 100b.

The microphone 131 may be integrally formed with the image display apparatus 100b or provided as a separate device. The microphone 131 that is provided as a separate device may be electrically connected to the image display apparatus 100b via the communicator 150 or the I/O unit 170.

One of ordinary skill in the art would be able to understand that the microphone 131 may be omitted depending on the performance and the structure of the image display apparatus 100b.

A camera 132 may receive images (e.g., sequential frames) that correspond to motions of the user which include a gesture within a recognition range of the camera 132. For example, the recognition range of the camera 132 may be about 0.1 m to about 5 m away from the user. Motions of the user may include a motion of a body part of the user, such as the face, hands, a fist, or fingers, for example, facial expressions. The camera 132 may convert the received image into an electric signal under the control of the controller 110 and output the electric signal to the controller 110.

According to an exemplary embodiment, the camera 132 may capture an image of the face of the user and output the image of the face to the controller 110 so that the controller 110 may use the image to identify the user that is viewing the image display apparatus 100b.

The controller 110 may receive a motion recognition result, and by using the motion recognition result, select a menu displayed on the image display apparatus 100b or perform a control operation that corresponds to the motion recognition result. The control operation may include, for example, changing channels, adjusting volume, moving an indicator, and moving a cursor.

The camera 132 may include a lens (not shown) and an image sensor (not shown). The camera 132 may support an optical zoom feature and a digital zoom feature by using a plurality of lenses and an image processor. The recognition range of the camera 132 may vary according to an angle and surrounding environments of the camera 132. When the camera 132 includes a plurality of cameras, 3D still images or 3D motions may be received by using the plurality of cameras.

The camera 132 may be integrally formed with the image display apparatus 100b or provided in a separate device. A separate device (not shown) that includes the camera 132 may be electrically connected to the image display apparatus 100b via the communicator 150 or the I/O unit 170.

One of ordinary skill in the art would be able to understand that the camera 132 may be omitted depending on the performance and the structure of the image display apparatus 100b.

An optical receiver 133 may receive an optical signal (including a control signal) from an external controller via a light window of a bezel of the display 120. The optical receiver 133 may receive an optical signal that corresponds to a user input (e.g., touching, pressing, touch gesture, voice, or motion) from the controller. A control signal may be extracted from the received optical signal under the control of the controller 110.

Under the control of the controller 110, the I/O unit 170 may receive a video (e.g., moving images), audio (e.g., voice or music) and additional information (e.g., EPG) from a source outside the image display apparatus 100b. The I/O unit 170 may include one selected from a high-definition multimedia interface (HDMI) port 171, a component jack (172), a PC port (173), a universal serial bus (USB) port (174), or a combination thereof.

One of ordinary skill in the art would be able to understand that features and operations of the I/O unit 170 may vary according to exemplary embodiments.

The controller 110 may control overall operations of the image display apparatus 100b, control a flow of signals among the components in the image display apparatus 100b, and process data. When the controller 110 receives a user input or satisfies a preset, pre-stored condition, the controller 110 may execute an operating system (OS) and various applications stored in the storage unit 190.

The controller 110 may include a RAM 181 that stores a signal or data that is input from a source outside the image display apparatus 100b or is used as a storage area for various operations performed in the image display apparatus 100b, a ROM 182 that stores a control program for controlling the image display apparatus 100b, and a processor 183.

The processor 183 may include a graphic processing unit (GPU) 184 (e.g., graphic processor) for processing video graphics. The processor 183 may be provided as a system on chip (SoC) that integrates a core (not shown) and a GPU (not shown). The processor 183 may include a single-core processor, a dual-core processor, a triple-core processor, a quad-core processor, or any other type of multi-core processor.

Also, the processor 183 may include a plurality of processors. For example, the processor 183 may be implemented as a main processor and a sub-processor that operates in a sleep mode.

A graphic processor 184 may generate a screen that includes various objects such as icons, images, and text by using a calculator (not shown) and a rendering unit (not shown). The calculator may calculate a property value, such as coordinates, a shape, a size, and a color, of each object according to a screen layout by using a user input detected by the sensor 130. Based on the property value calculated by the calculator, the rendering unit may generate various screen layouts that include the objects. The screen generated by the rendering unit is displayed in a display area of the display 120.

First to n-th interfaces 185-1 to 185-n are connected to the above-described components. One of the first to n-th interfaces 185-1 to 185-n may be a network interface that is connected to an external device via a network.

The RAM 181, the ROM 182, the processor 183, the graphic processor 184, and the first to n-th interfaces 185-1 to 185-n may be connected to each other via an internal bus 186 or some other connection mechanism known to those skilled in the art.

According to the present exemplary embodiment, the term "controller of an image display apparatus" may include the processor 183, the ROM 182, and the RAM 181.

Under the control of the controller 110, the storage unit 190 may store various pieces of data, programs, or applications for operating and controlling the image display apparatus 100b. The storage unit 190 may store input or output signals or input or output data which correspond to operations of the video processor 180, the display 120, the audio processor 115, the audio output unit 125, the power unit 160, the tuner 140, the communicator 150, the sensor 130, and the I/O unit 170. The storage unit 190 may store a control program for controlling the image display apparatus 100b and the controller 110, an application that is initially provided by a manufacturer or downloaded from an external source, a GUI related to an application, an object (e.g., images, text, icons, or buttons) for providing a GUI, user information, documents, databases, or related data.

According to an exemplary embodiment, the term "storage unit" may include the storage unit 190, the ROM 182 or the RAM 181 of the controller 110, or a memory card (e.g., micro SD card or USB memory) mounted in the image display apparatus 100b. Also, the storage unit 190 may be implemented as a non-volatile memory, a volatile memory, a hard disk drive (HDD), or a solid-state drive (SSD).

The storage unit 190 may include a broadcast reception module, a channel control module, a volume control module, a communication control module, an audio recognition module, a motion recognition module, an optical reception module, a display control module, an audio control module, an external input control module, a power control module, a power control module of an external device that is wirelessly connected (e.g., via Bluetooth), an audio database, or a motion database. The modules and databases of the storage unit 190 which are not illustrated may be provided as software for performing a broadcast reception control function, a channel control function, a volume control function, a communication control function, an audio recognition function, a motion recognition function, an optical reception function, a display control function, an audio control function, an external input control function, a power control function, or a power control function of the external device power that is wirelessly connected (e.g., via Bluetooth) in the image display apparatus 100b. The controller 110 may perform each function by using the software stored in the storage unit 190.

Also, the image display apparatus 100b including the display 120 may be electrically connected to a separate external device (not shown, e.g., a set-top box) that includes a tuner. For example, the image display apparatus 100b may be, but is not limited to, an analog TV, a digital TV, a 3D TV, a smart TV, an LED TV, an OLED TV, a plasma TV, or a monitor.

The image display apparatus 100b may include a sensor (not shown, e.g., an illuminance sensor or a temperature sensor) that detects an internal or external status of the image display apparatus 100b.

The block diagrams of the image display apparatuses 100a and 100b shown in FIGS. 2 and 3 are only exemplary embodiments. According to the actual performance of the image display apparatuses 100a and 100b, the components illustrated in the block diagrams may be combined or omitted, or components other than those in the block diagrams may be further added. That is, two or more components may be combined as a single component, or a single component may be divided into two or more components. Also, respective functions of blocks shown in the block diagrams are for describing the exemplary embodiments, and the specific operations or units corresponding to the blocks do not limit the scope of the exemplary embodiments.

Figure 4:
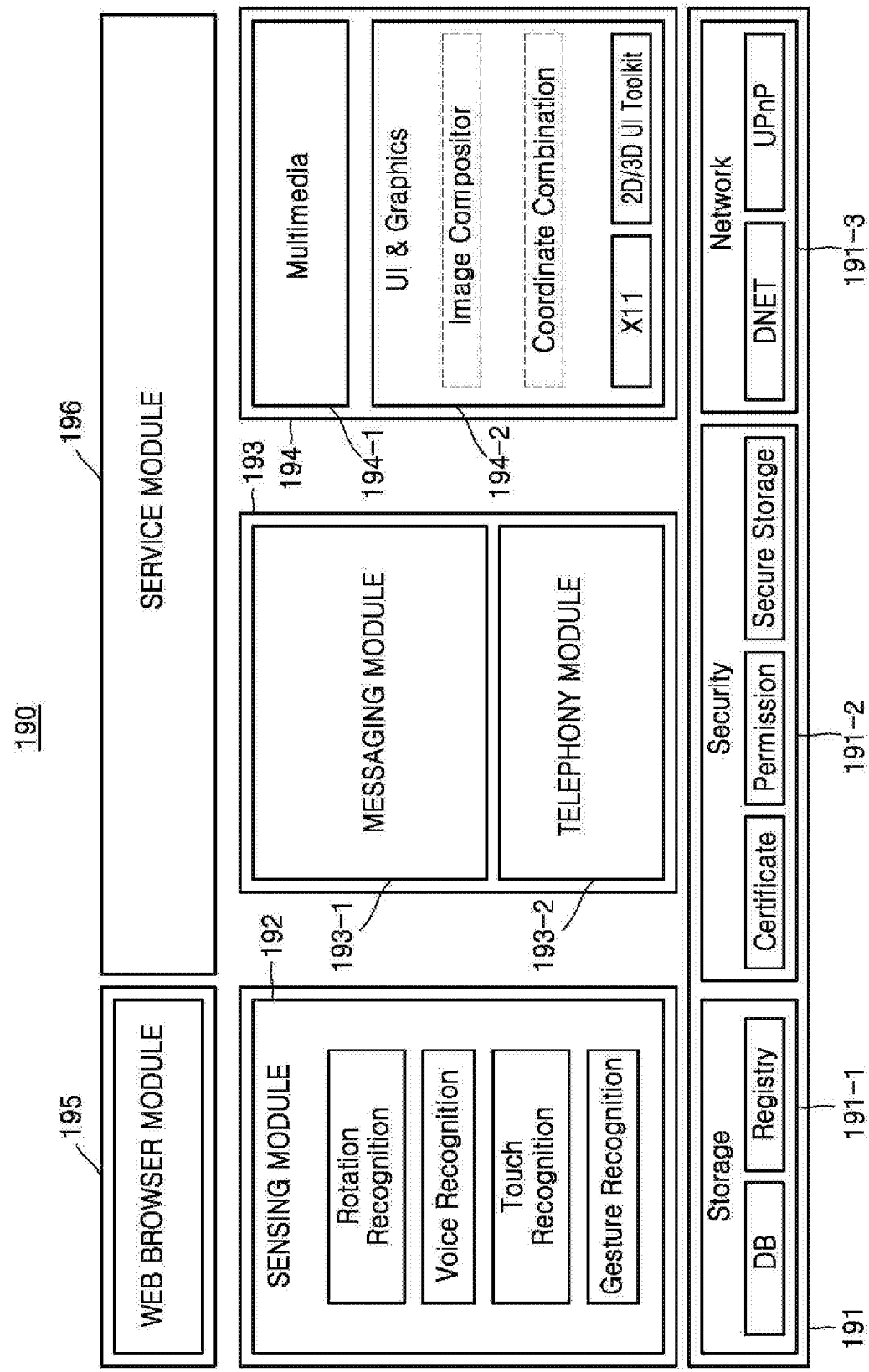
FIG. 4 is a block diagram of software stored in a storage unit of FIG. 3.

FIG. 4 is a block diagram of software stored in the storage unit 190 of FIG. 3.

Referring to FIG. 4, the storage unit 190 may store software that includes a base module 191, a sensing module 192, a communication module 193, a presentation module 194, a web browser module 195, and a service module 196.

The base module 191 refers to a basic module that processes signals transmitted from hardware in the image display apparatus 100 and transmits the processed signals to an upper layer module. The base module 191 includes a storage module 191-1, a security module 191-2, and a network module 191-3. The storage module 191-1 is a program module that manages a database or registry. The processor 183 may access the database in the storage unit 190 by using the storage module 191-1, and extract data. The security module 191-2 is a program module that supports operations related to the hardware, such as certification, permission, and secure storage. The network module 191-3 is a module for supporting network connection, and includes a device network (DNET) module or a universal plug and play (UPnP) module. It is understood that these modules are exemplary only, and many other types of modules may be included in the base module 191 instead of, or in addition to, the storage module 191-1, the security module 191-2, and the network module 191-3.

The sensing module 192 accumulates information from sensors, and analyzes and manages the accumulated information. The sensing module 192 may include a head direction recognition module, a face recognition module, a voice recognition module, a motion recognition module, an NFC recognition module, and various other types of modules.

The communication module 193 communicates with external devices. The communication module 193 may include a messaging module 193-1 such as a messenger program, a Short Message Service (SMS) and Multimedia Message Service (MMS) program, and an e-mail program, and a telephony module 193-2 such as a call information aggregator program module and a VoIP module.

The presentation module 194 configures a display screen. The presentation module 194 includes a multimedia module 194-1 for reproducing and outputting multimedia content and a UI rendering module 194-2 for UI and graphic processing. The multimedia module 194-1 may include a player module, a camcorder module, and a sound processing module. Accordingly, the multimedia module 194-1 generates and reproduces a screen and sound by reproducing multimedia content. The UI rendering module 194-2 may include an image compositor module for compositing images, a coordinate combination module for combining and generating coordinates on a screen for displaying images, an X11 module for receiving events from hardware, or a 2D/3D UI tool kit that provides a tool for configuring a 2D or 3D UI.

The web browser module 195 may browse websites and access a web server. The web browser module 195 may include various modules such as a web view module for configuring a web page, a download agent module for downloading, a bookmark module, or a WebKit module.

The service module 196 includes applications for providing various services. In particular, the service module 196 may include various program modules such as an SNS program, a content reproduction program, a game program, an e-book program, a calendar program, an alarm manager program, and other widgets.

According to a type or properties of an image display apparatus, the various program modules shown in FIG. 4 may be omitted or modified, or program modules other than those of FIG. 4 may be added. For example, a location based module, such as a GPS chip, which supports a location based service by being connected to hardware may be further included.

Figure 5:
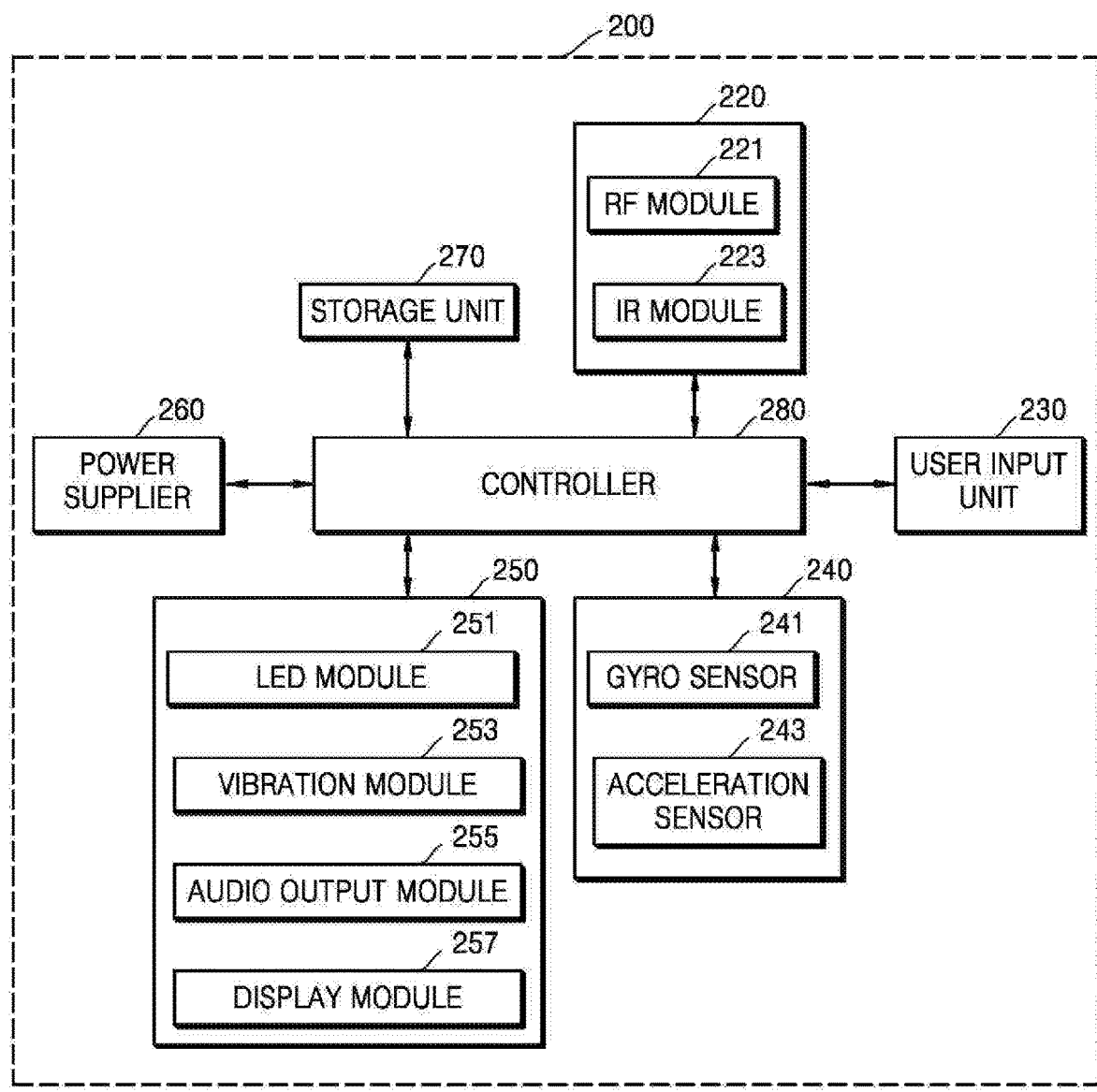
FIG. 5 is a block diagram of a controller according to an exemplary embodiment.

FIG. 5 is a block diagram of the control apparatus 200 according to an exemplary embodiment.

Referring to FIG. 5, the control apparatus 200 may include a wireless communicator 220, a user input unit 230 (e.g., user inputter), a sensor 240, an output unit 250 (e.g., outputter), a power supplier 260, a storage unit 270 (e.g., storage), and a controller 280.

The wireless communicator 220 may transmit and receive signals to and from any of the image display apparatuses 100, 100a, and 100b described above. The wireless communicator 220 may include an RF module 221 that may transmit and receive signals to and from the image display apparatus 100 according to an RF communication standard. Also, the wireless communicator 220 may include an infrared (IR) module 223 that may transmit and receive to and from the image display apparatus 100 according to an IR communication standard.

According to the present exemplary embodiment, the control apparatus 200 transmits a signal including information about motions of the control apparatus 200 to the image display apparatus 100 via the RF module 221.

Also, the control apparatus 200 may receive a signal transmitted by the image display apparatus 100 via the RF module 221. Also, the control apparatus 200 may transmit commands for turning power on or off, changing channels, and changing a volume of the image display apparatus, to the image display apparatus 100 via the IR module 223.

The user input unit 230 may include a keypad, buttons, a touchpad, or a touch screen. The user may manipulate the user input unit 230 and input commands related to the image display apparatus 100 to the control apparatus 200. When the user input unit 230 includes hard key buttons, the user may input the commands related to the image display apparatus 100 to the control apparatus 200 by pushing the hard key buttons. When the user input unit 230 includes a touch screen, the user may input the commands related to the image display apparatus 100 to the control apparatus 200 by touching soft keys on the touch screen.

For example, the user input unit 230 may include 4-directional buttons or 4-directional keys. The 4-directional buttons or the 4-directional keys may be used to control windows, areas, applications, or items displayed on the display 120. The 4-directional keys or buttons may be used to instruct upward, downward, leftward, and rightward movements. Also, one of ordinary skill in the art would be able to understand that the second user input unit 230 may include 2-directional keys o 2-directional buttons instead of the 4-directional keys or the 4-directional buttons, or n-directional keys or n-directional buttons (n being an integer).

Also, the user input unit 230 may include various types of input units that may be manipulated by the user, such as a scroll key or a jog key.

Also, the user input unit 230 may include a touchpad. The user input unit 230 according to an exemplary embodiment may receive a user input for dragging, touching, or flipping via the touchpad of the control apparatus 200. Also, the image display apparatus 100 may be controlled according to a type of received user input (for example, a direction in which a drag command is input or a time when a touch command is input).

The sensor 240 may include a gyro sensor 241 or an acceleration sensor 243. The gyro sensor 241 may detect information about movements of the control apparatus 200. For example, the gyro sensor 241 may detect the information about the movements of the control apparatus 200 based on x-, y-, and/or z-axes. The acceleration sensor 243 may detect information about movement speed of the control apparatus 200. The gyro sensor 241 may additionally include a distance estimation sensor that may detect a distance between the control apparatus 200 and the image display apparatus 100.

The output unit 250 may output an image signal or an audio signal which corresponds to a manipulation of the user input unit 230 or a signal received by the image display apparatus 100. The user may recognize whether the user input unit 230 is manipulated or whether the image display apparatus 100 is controlled, via the output unit 250.

For example, the output unit 250 may include an LED module 251, a vibration module 253, an audio output module 255, and a display module 257, which emits light, vibrates, outputs sound, and outputs an image, respectively, when the user input unit 230 is manipulated or a signal is transmitted to and received from the image display apparatus 100 via the wireless communicator 220.

The power supplier 260 supplies power to the control apparatus 200. The power supplier 260 may prevent excessive power consumption by not supplying power when the control apparatus 200 does not move for a predetermined time. The power supplier 260 may start to supply power again when a predetermined key in the control apparatus 200 is manipulated.

The storage unit 270 may store programs or application data for controlling operations of the control apparatus 200.

The controller 280 controls overall operations related to controlling the control apparatus 200. The controller 280 may transmit a signal corresponding to a predetermined key manipulation of the user input unit 230 or a signal corresponding to a movement of the control apparatus 200 detected by the sensor 240 to the image display apparatus 100 via the wireless communicator 220.

The image display apparatus 100 may include a coordinate value estimator (not shown) that estimates coordinates of a cursor that corresponds to operations of the control apparatus 200.

The coordinate value estimator may estimate coordinates (x,y) of a cursor to be displayed on the display 120 by correcting hand shaking or errors based on a detected signal that corresponds to the operations of the control apparatus 200.

Also, a signal from the control apparatus 200 is detected by the sensor 130 and transmitted to the controller 110 of the image display apparatus 100. The controller 110 may determine information about the operations and a key manipulation of the control apparatus 200 based on the signal from the control apparatus 200, and control the image display apparatus 100 with respect to the information.

As another example, the control apparatus 200 may estimate coordinates of a cursor which corresponds to the operations of the control apparatus 200 and transmit the coordinates to the image display apparatus 100. In this case, the image display apparatus 100 may transmit information about the coordinates to the controller 110 without a hand-shake correction or an error correction.

Figure 6:
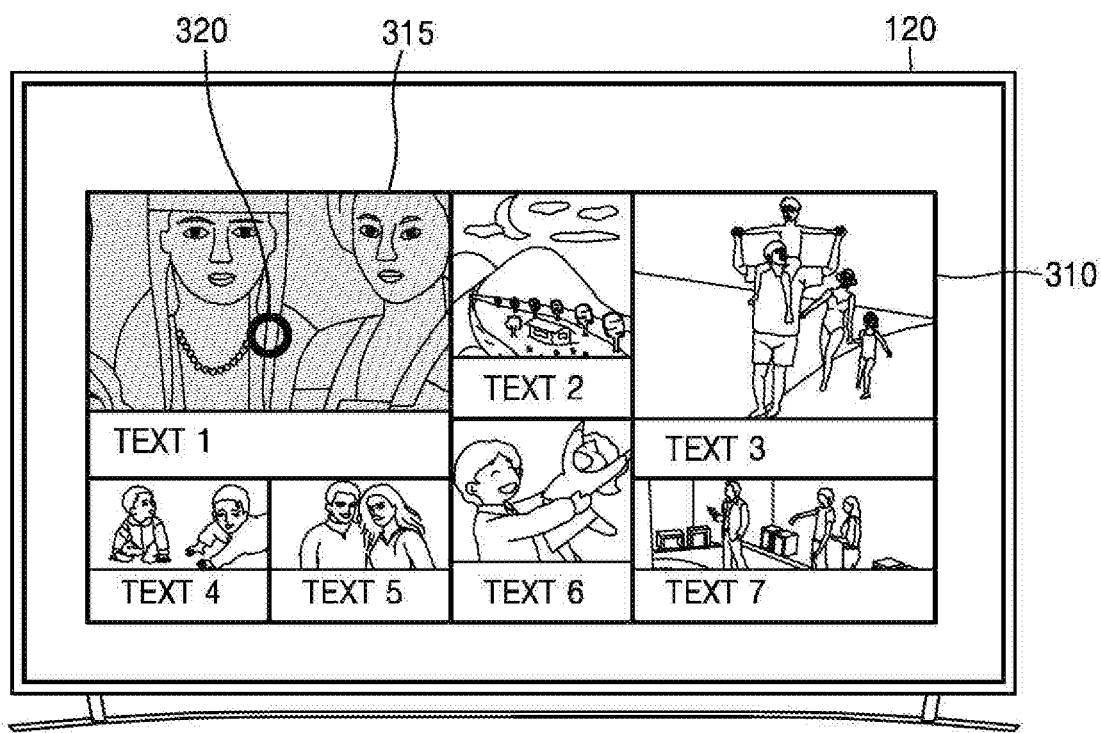
FIG. 6 is a diagram of an example in which an item list is displayed on a display, according to an exemplary embodiment.

FIG. 6 is a diagram of an example in which an item list 310 is displayed on a display, according to an exemplary embodiment.

Referring to FIG. 6, the display 120 may display the item list 310 that includes a plurality of items. For example, the display 120 may display a plurality of items that show content. An item that shows content may include an item that shows image content such as movies or dramas, an item that shows audio content such as music, an item that shows game content, an item that shows applications, an item that shows a broadcasting channel, and an item that shows history information of content executed by the user, although the types of items are not limited thereto.

The plurality of items may be displayed by using images. For example, an item that shows image content such as a movie or a drama may be displayed using an image of a movie poster or a drama poster. Alternatively, an item that shows audio content such as music may be displayed using a poster image of an album that includes the music. Alternatively, an item that shows an application may be displayed using an image that represents the application or a last execution screen of the application. Alternatively, an item that shows a broadcasting channel may be displayed using a last screen image of the channel viewed by the user or an image of a current program of the channel. Alternatively, an item that shows history information of content executed by the user may be displayed using a last execution screen of the content.

Referring to FIG. 6, each of the plurality of items in the item list 310 may be displayed as a quadrilateral. The quadrilaterals may have an identical size or different sizes. For example, respective heights and widths of the quadrilaterals may be different according to a type or properties of content that corresponds to each of the plurality of items. However, exemplary embodiments are not limited thereto. The quadrilaterals may include a square having the same width and height, or a rectangle having a different height and width. Shapes other than quadrilaterals (e.g., triangles, circles, etc.) may also be used according to other exemplary embodiments.

Referring to FIG. 6, the display 120 may display a cursor 320 that indicates a location of a user input. For example, when an input for touching a predetermined button of the control apparatus 200 is detected, the image display apparatus 100 may display the cursor 320. Also, the cursor 320 may be moved on the display 120 in response to the detected user input.

Although the cursor 320 is shown as a circle in FIG. 6, a shape and a size of the cursor 320 is not limited thereto. The shape and the size of the cursor 320 may be modified in various ways based on a user input.

The cursor 320 may be located in any one of the plurality of items in the item list 310. When the cursor 320 is located in any one of the plurality of items, for example, an item 315, the item 315 may be highlighted. According to an exemplary embodiment, a highlighted item may be referred to as Fovea. The item 315 may be highlighted by changing a color of the item 315 or drawing a quadrilateral box on edges of the item 315, although the highlighting is not limited thereto.

The controller 110 according to an exemplary embodiment may gradually change properties of an item according to an overlapping extent of a virtual area that is set with respect to the cursor 320 (hereinafter, "first virtual area") and a virtual area that is set with respect to the item (hereinafter, "second virtual area"). For example, a size of the item may be changed, content (e.g., image or text) shown on the item may be increased or decreased in size, or an opacity or a color of the content shown in the item may be changed. Alternatively, a location of the content shown in the item may be changed. However, exemplary embodiments are not limited thereto.

Also, when a user input for selecting the highlighted item is detected, the controller 110 may perform an operation corresponding to the selected item. For example, in the case that the highlighted item is an item that shows an application, when an input for selecting the highlighted item is detected, the application may be executed. Also, the display 120 may display an execution screen of the application. When the sensor 130 detects an input for pressing a predetermined key of the control apparatus 200, the controller 110 may end an operation of the application. For example, when the sensor 130 detects an input for pressing any one of 4-directional keys of the control apparatus 200 for a long time, the controller 110 may stop displaying an execution screen of the application and display a screen including an item list again.

Figure 7B:
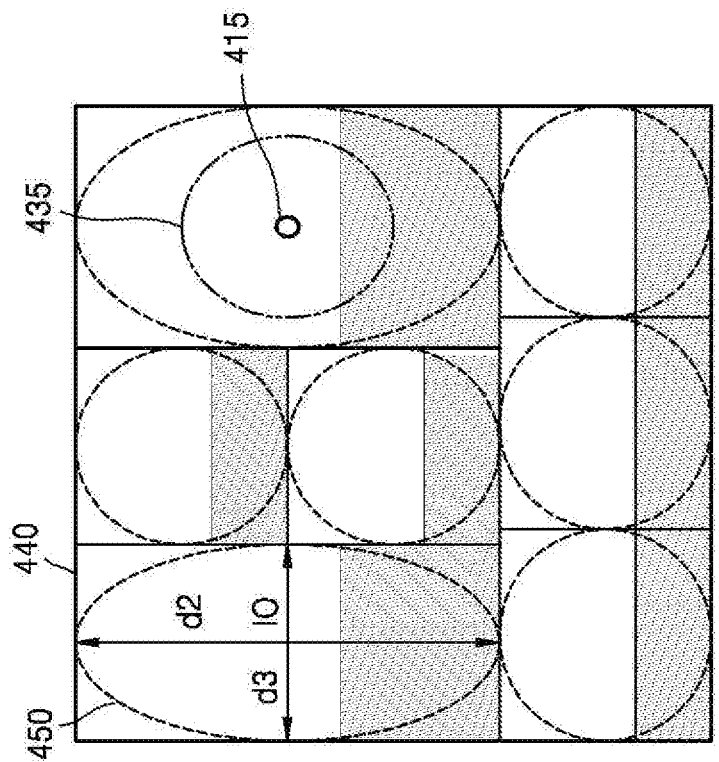
FIGS. 7A and 7B are diagrams of an item list according to an exemplary embodiment.
Figure 7A:
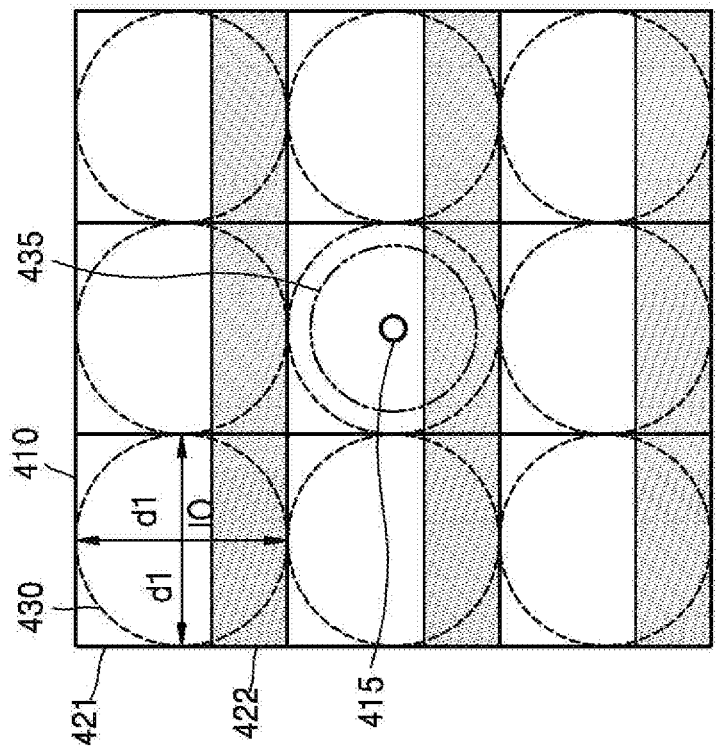

FIGS. 7A and 7B are diagrams of an item list according to an exemplary embodiment.

FIG. 7A shows an item list in which a plurality of items in the item list have identical shapes and sizes. FIG. 7B shows an item list in which a plurality of items in the item list have different shapes and sizes.

Referring to FIG. 7A, an item 410 in the item list may be divided into, but is not limited to being divided into, a first area 421 in which an image is displayed and a second area 422 in which text is displayed.

Also, as shown in FIG. 7A, the plurality of items in the item list may be in the form of squares having identical heights and widths. Also, a virtual area 430 (e.g., second virtual area) may be set with respect to each of the plurality of items. For example, in the case that the item 410 is in the form of a square having a height and a width equal to a first distance d1, the virtual area 430 that is set with respect to the item 410 may be in the form of a circle having the first distance d1 as a diameter and a center 10 of the item 410 as a center.

Referring to FIG. 7B, the plurality of items may be in the forms of rectangles having different heights and widths.

Also, a virtual area 450 (e.g., second virtual area) may be set with respect to each of the plurality of items. For example, in the case that an item 440 is in the form of a rectangle having a height equal to a second distance d2 and a width equal to a third distance d3, a virtual area 450 that is set with respect to the item 440 may be in the form of an oval having the second distance d2 as a major axis, the third distance d3 as a minor axis, and a center 10 of the item 440 as a center.

Referring to FIGS. 7A and 7B, a virtual area 435 (first virtual area) may be set with respect to a cursor 415. The virtual area 435 that is set with respect to the cursor 415 may be in the form of a circle having a predetermined distance as a diameter and a center of the cursor 415 as a center. The predetermined distance may be an average of respective minor axes or diameters of virtual areas that are set with respect to the plurality of items. Alternatively, the predetermined distance may be an average of the respective minor axes or diameters of the virtual areas, to which a weight calculated based on a distance from the center of the cursor 415 to a center of an item is applied.

With respect to each of the plurality of items, the image display apparatus 100 according to an exemplary embodiment may calculate a first parameter (transnear) that indicates an overlapping extent of a second virtual area of an item and a first virtual area of a cursor. The image display apparatus 100 may gradually change properties of the item according to the first parameter (transnear).

Hereinafter, a method of calculating the first parameter (transnear) will be described in detail with reference to FIGS. 8A, 8B, 8C and 8D.

FIGS. 8A to 8D are diagrams of a location relationship between a first virtual area and a second virtual area, according to an exemplary embodiment.

Figure 8A:
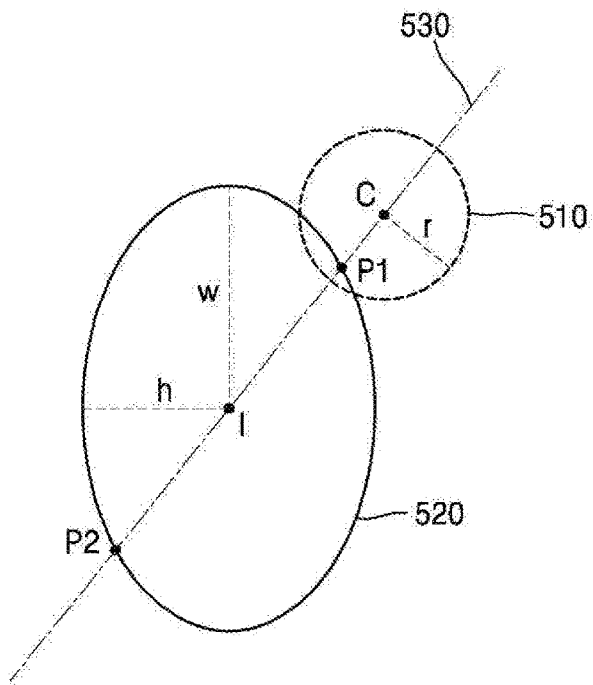
FIGS. 8A, 8B, 8C and 8D are diagrams of a location relationship between a first virtual area and a second virtual area, according to an exemplary embodiment.

FIG. 8A shows an example in which a portion of a first virtual area 510 overlaps a portion of a second virtual area 520. Referring to FIG. 8A, the first virtual area 510 may be a circle having a first center C (a center of a cursor) and a radius r, and the second virtual area 520 may be an oval having a second center I (a center of an item), a major axis of 2w, and a minor axis of 2h.

The image display apparatus 100 may calculate a first line 530 that crosses the first center C and the second center I, and intersection points (a first intersection point P1 and a second intersection point P2) between the second virtual area 520 and the first line 530. Also, the image display apparatus 100 may calculate a value (dis) by dividing a distance between the first and second intersection points P1 and P2 by 2, and a distance (result) between the first center C of the first virtual area 510 and the second center I of the second virtual area 520. Accordingly, the image display apparatus 100 may acquire the first parameter (transnear) by calculating "1−result/(r+dis)."

Figure 8B:
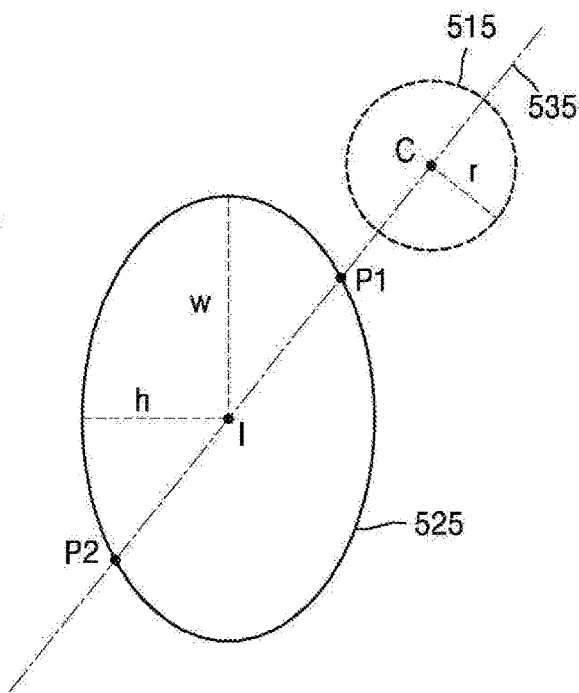

FIG. 8B shows an example in which a first virtual area 515 does not overlap a second virtual area 525.

As shown in FIG. 8B, when a sum of a value (dis) obtained by dividing a distance between a first intersection point P1 and a second intersection point P2 by 2 and a radius r of the first virtual area 515 is greater than a distance between a first center C and a second center I, a first parameter (transnear) may be 0 where each of the first intersection point P1 and the second intersection point P2 intersects the second virtual area 525 and a line 535 that crosses the first center C and the second center T.

Figure 8C:
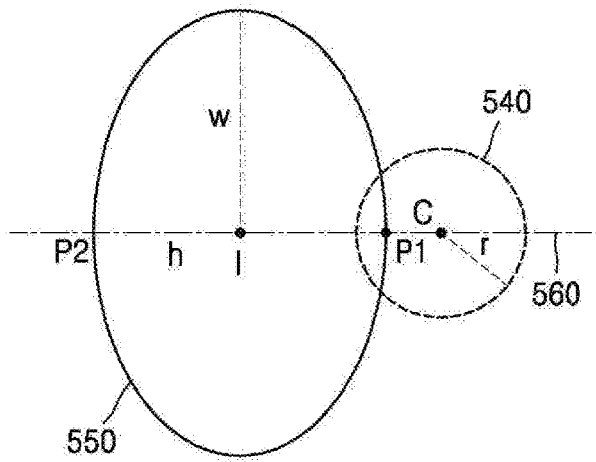

FIG. 8C shows an example in which a y-coordinate value of a first center C of a first virtual area 540 is the same as a y-coordinate value of a second center I of a second virtual area 550. In FIG. 8C, since a distance between a first intersection point P1 and a second intersection point P2 is the same as a length of a minor axis of the second virtual area 550, a value of 'dis' is the same as a value of h where each of the first intersection point P1 and the second intersection point P2 intersects the second virtual area 550 and a line 560 that crosses the first center C and the second center I. Accordingly, a first parameter (transnear) may be obtained by calculating "1−result/(r+h)."

Figure 8D:
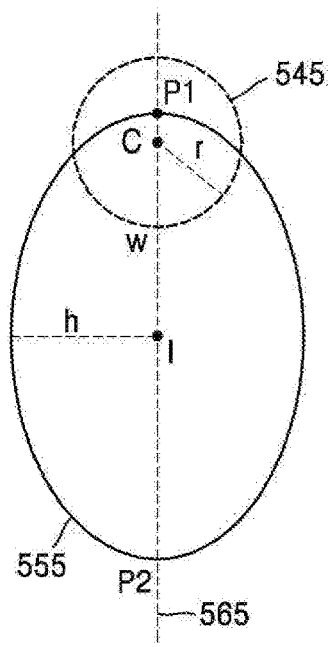

FIG. 8D shows an example in which an x-coordinate value of a first center C is the same as an x-coordinate value of a second center I. In FIG. 8D, since a distance between a first intersection point P1 and a second intersection point P2 is the same as a length of a major axis 565 of a second virtual area 555, a value of 'dis' is the same as a value of w. Accordingly, a first parameter (transnear) may be obtained by calculating "1−result/(r+w)."

When a first center of a first virtual area is the same as a second center of a second virtual area (that is, when an overlapping extent of the first and second virtual areas is maximized), a first parameter (transnear) is 1. When the first virtual area and the second virtual area do not overlap each other, the first parameter (transnear) is 0. Thus, the first parameter (transnear) may range from 0 to 1.

Figure 9:
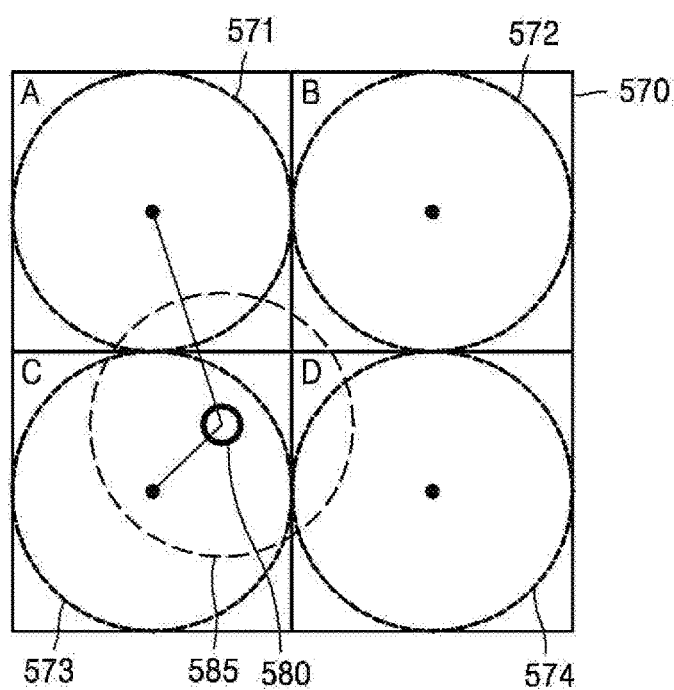
FIG. 9 is a diagram of an example in which first parameters (transnears) of items in an item list are determined according to a location of a cursor.

FIG. 9 is a diagram of an example in which first parameters (transnears) of items in an item list are determined according to a location of a cursor.

Referring to FIG. 9, the display 120 may display an item list 570 that includes 4 items (a first item A, a second item B, a third item C, and a fourth item D). The first to fourth items A to D may be displayed as four squares having identical heights and widths (e.g., 200). Also, virtual areas 571 to 574 may be set in each of the first to fourth items A to D as a circle having a center of each item as a center and a height of each item as a diameter. Also, a virtual area 585 having a center of a cursor 580 as a center and a predetermined length as a diameter may be set in the cursor 580.

As shown in FIG. 9, when the cursor 580 is located in an upper right portion of the third item C, the respective virtual areas 571, 573, and 574 of the first item A, the third item C, and the fourth item D overlap the virtual area 585 of the cursor 580, but the virtual area 572 of the second item B does not overlap the virtual area 585 of the cursor 580.

As shown in a table of FIG. 9, respective first parameters (transnears) of the first, third, and fourth items A, C, and D may be determined based on a distance between a center of the cursor 580 and a center of each item, a radius of the virtual area 585 that is set in the cursor 580, and respective radii of the virtual areas 571, 573, and 574 that are set in the first, third, and fourth items A, C, and D. In this case, a first parameter (transnear) increases as an overlapping extent of a virtual area of an item and a virtual area of a cursor increases.

Since the virtual area 572 of the second item B does not overlap the virtual area 585 of the cursor 580, a first parameter (transnear) of the second item B may be 0.

According to an exemplary embodiment, respective first parameters (transnears) of a plurality of items may be determined based on an overlapping extent of virtual areas that are set in the plurality of items and a virtual area of a cursor displayed on the display 120. Also, respective properties of the plurality of items may be determined based on the respective first parameters (transnears) of the respective items. The image display apparatus 100 according to an exemplary embodiment may gradually change properties of an item according to a first parameter (transnear).

Figure 10:
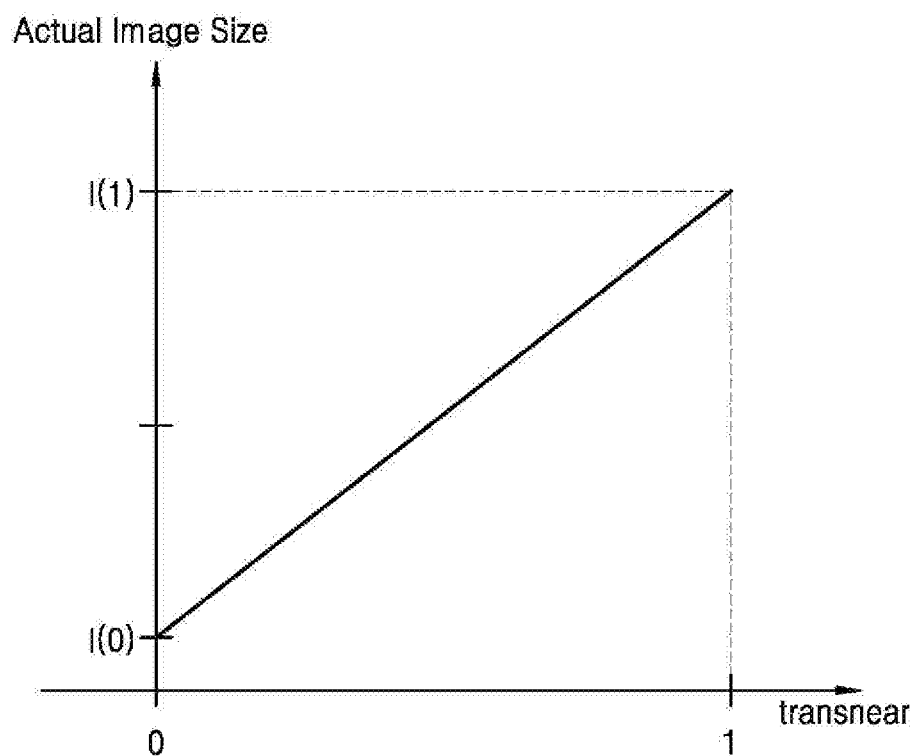
FIG. 10 is a graph of a size of an image in an item according to a first parameter (transnear) of the item, according to an exemplary embodiment.

FIG. 10 is a graph of a size of an image in an item according to a first parameter (transnear), according to an exemplary embodiment.

Referring to FIG. 10, an x-axis of the graph indicates a first parameter (transnear), and a y-axis of the graph indicates a size of an image in an item. For example, the image may be the image displayed in the first area 421 of FIG. 7A.

When the image in the item is maximized, a full size of the maximized image may be I(1); when the image in the item is minimized, a full size of the minimized image may be I(0). Therefore, the size of the image in the item may range from I(0) to I(1). Also, based on the description with reference to FIG. 8, the first parameter (transnear) of the item may range from 0 to 1.

According to an exemplary embodiment, when a cursor is located in a center of an item, an image in a highlighted item (Fovea) may be maximized and displayed. That is, when a first parameter (transnear) of the item is 1, a size of an image in the item may be set to I(1).

According to an exemplary embodiment, when an image in an item is maximized and has a size of I(1), only a portion of an entire image may be displayed on the item. Accordingly, regardless of whether an image is increased or decreased in size, a size of an image displayed on an item may be identical.

On the other hand, when a virtual area of an item does not overlap a virtual area of a cursor, an image displayed on an item may be minimized. That is, when a first parameter (transnear) of the item is 0, a size of an image in the item may be set to I(0).

The image display apparatus 100 according to an exemplary embodiment may increase or decrease sizes of images in a plurality of items based on the graph of FIG. 10. However, the graph of FIG. 10 is only an exemplary embodiment. The image display apparatus 100 may increase or decrease sizes of images in a plurality of items based on various graphs that show sequential changes of the sizes of the images in the items from I(0) to I(1), as the first parameter (transnear) changes from 0 to 1. For example, the image display apparatus 100 according to another exemplary embodiment may increase or decrease sizes of images based on a non-linear function.

Also, although the graph of FIG. 10 is described as a graph for determining sizes of images (content) in a plurality of items according to first parameters (transnears), the graph of FIG. 10 may also be used as a graph for determining sizes of the items, and opacities, colors, and locations of content displayed in the items.

FIGS. 11A, 11B, 11C and 11D are diagrams of examples in which content displayed on a plurality of items are increased or decreased in size as a cursor moves, according to an exemplary embodiment.

Figure 11A:
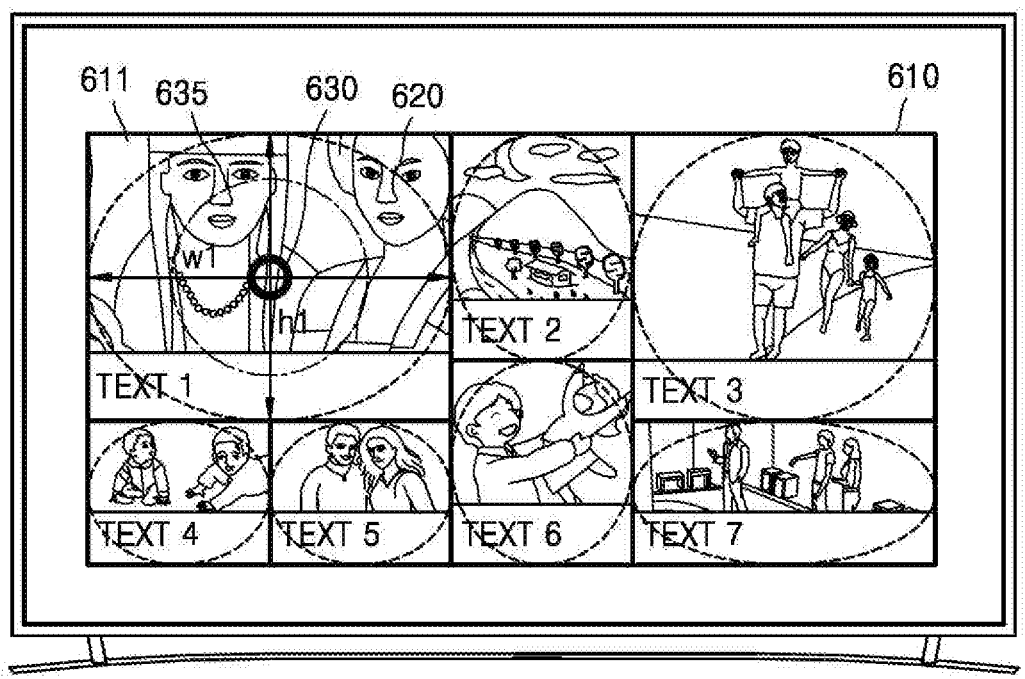
FIGS. 11A, 11B, 11C and 11D are diagrams of examples in which content displayed on a plurality of items are increased or decreased in size as a cursor moves, according to an exemplary embodiment.
Figure 11A:
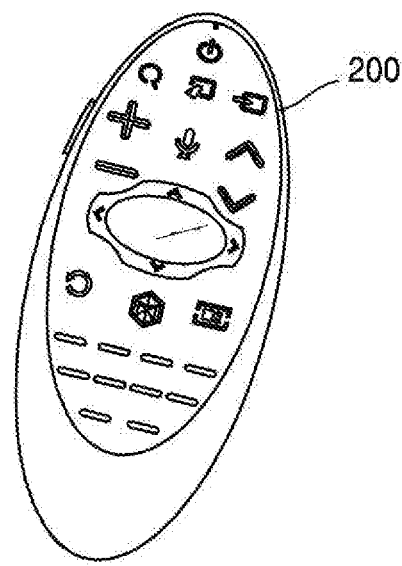

Referring to FIG. 11A, the display 120 may display an item list 610 that includes a plurality of items. The plurality of items in the item list 610 may be arranged in horizontal and vertical directions, and each of the plurality of items may show content. Also, a virtual area (second virtual area) may be set with respect to each of the plurality of items.

When an item is displayed as a square having a first length as a height and a width, a virtual area that is set with respect to the item may be a circle having the first length as a diameter and a center of the item as a center. Also, when an item is displayed as a rectangle having a second length as a height and a third length as a width, a virtual area that is set with respect to the item may be an oval having the second length as a major axis, a third length as a minor axis, and a center of the item as a center. For example, a virtual area 620 that is set with respect to a first item 611 may be an oval having w1 as a major axis, h1 as a minor axis, and a center of the first item 611 as a center.

Also, the display 120 may display a cursor 630 that indicates a location of a user input, and the controller 110 may move the cursor 630 on the display 120 with respect to a detected user input. For example, when a predetermined button of a user input unit of the control apparatus 200 is pressed or when the control apparatus 200 detects a movement of a motion sensor (an acceleration sensor or a gyro sensor), the control apparatus 200 may transmit a certain key input to the image display apparatus 100. When the controller 110 receives a certain key input via the control apparatus 200, the controller 110 may display the cursor 630 on the display 120. Also, a first virtual area 635 may be set with respect to the cursor 630. For example, the first virtual area 635 that is set with respect to the cursor 630 may be a circle having a predetermined length as a diameter and a center of the cursor 630 as a center.

As shown in FIG. 11A, when the cursor 630 according to an exemplary embodiment is located in the center of first item 611 from among the plurality of items in the item list 610, an image displayed in the first item 611 may be maximized, and a size of the maximized image may be I(1), which has been described with reference to the graph of FIG. 10. Here, only a portion of the maximized image may be displayed with respect to a size of the first item 611.

Also, since virtual areas that are set with respect to items other than the first item 611 (hereinafter, referred to as "remaining items") do not overlap the virtual area that is set with respect to the cursor 630, an image displayed in each of the remaining items may be minimized and displayed, and respective sizes of the minimized images may be I(0), as shown in the graph of FIG. 10. Here, the respective sizes of the minimized images may be the same as the remaining items that show the minimized images.

The image display apparatus 100 may detect a user input for moving or tilting the control apparatus 200 upward, downward, leftward, or rightward. For example, the image display apparatus 100 may detect a moving direction and a moving extent of the control apparatus 200, and move the cursor 630 on the display 120 according to a detected movement. Also, the image display apparatus 100 may move the cursor 630 according to a direction of a touch input detected by a touch panel of the control apparatus 200.

Figure 11B:
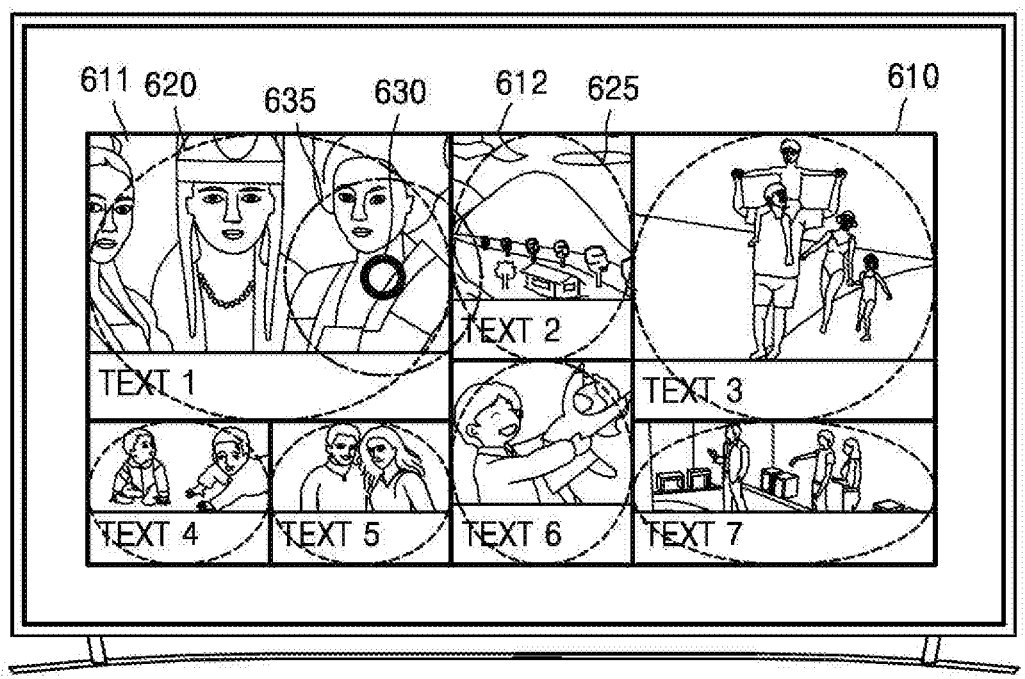
Figure 11B:
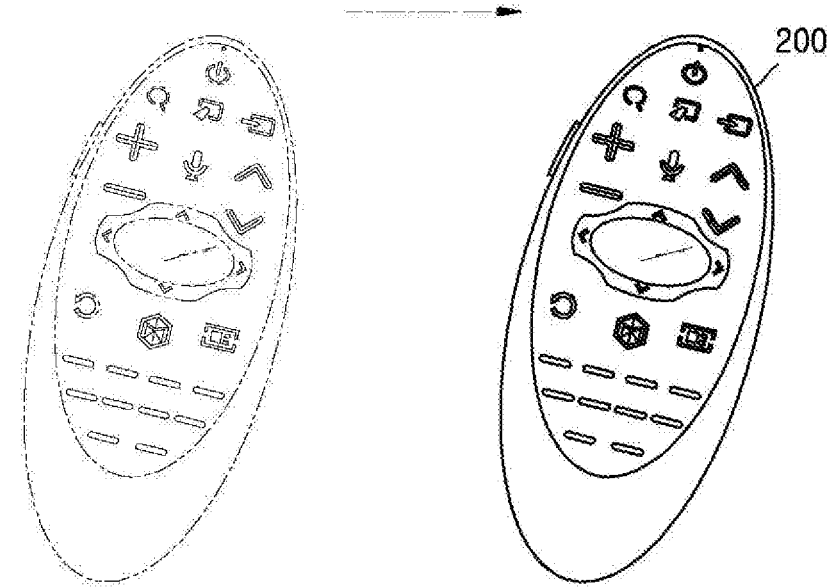

As shown in FIG. 11B, when a user input for moving the control apparatus 200 rightward is detected, the image display apparatus 100 may move the cursor 630 displayed on the display 120 in response to the detected user input. Here, information about a detected movement of the control apparatus 200 may be transmitted to the image display apparatus 100 via a sensor of the control apparatus 200. The image display apparatus 100 may estimate coordinates of the cursor 630 based on information about a movement of the control apparatus 200, and move the cursor 630 on the display 120 with respect to the estimated coordinates.

As shown in FIG. 11B, as the cursor 630 is moved rightward (that is, as an overlapping extent of the first virtual area 635 that is set with respect to the cursor 630 and the virtual area 620 that is set with respect to the first item 611 decreases, and an overlapping extent of the first virtual area 635 and a virtual area 625 that is set with respect to a second item 612 located at a right side of the first item 611 increases), the image display apparatus 100 may gradually decrease a size of an image displayed on the first item 611 and gradually increase a size of an image displayed on the second item 612. Regardless of whether the image is increased or decreased in size, only a portion of the image may be displayed according to a size of the item. Therefore, a size of an area in which the image is displayed may be uniform regardless of whether the image is increased or decreased in size.

Also, a size of an image in the first item 611 and a size of an image in the second item 612 may be simultaneously changed according to the graph shown in FIG. 10 or according to another graph.

Figure 11C:
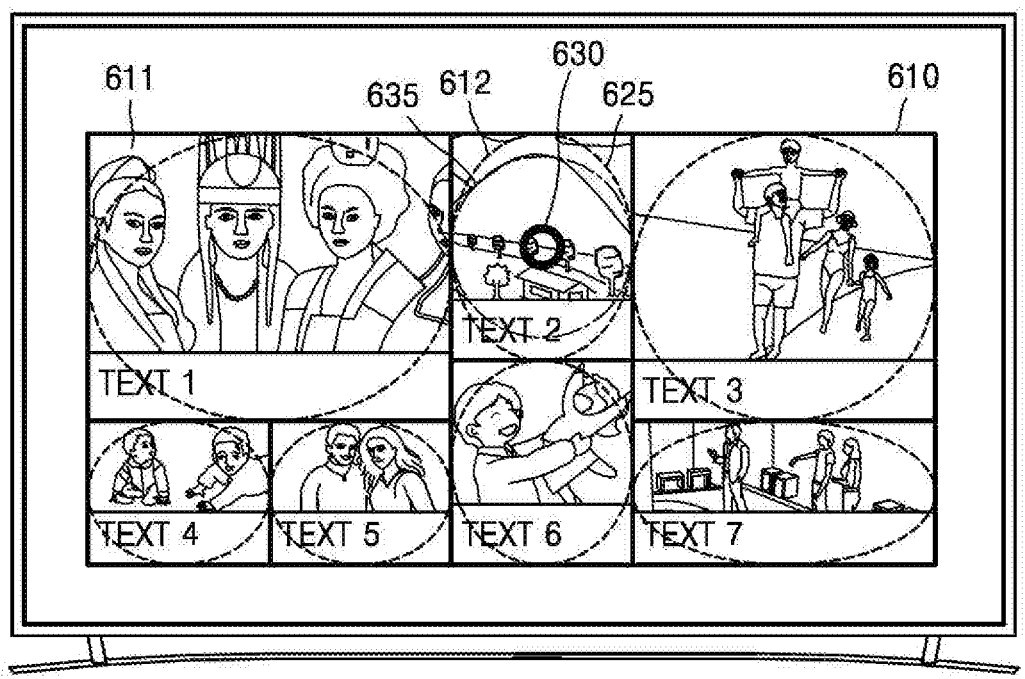
Figure 11C:
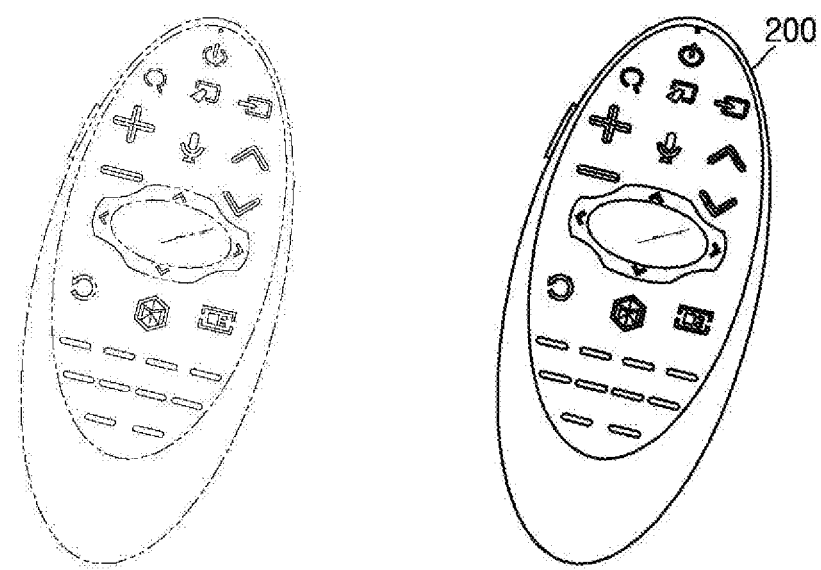

When a user input for gradually moving the control apparatus 200 rightward is detected, in response to the detected user input, the image display apparatus 100 may gradually move the cursor 630 on the display 120 in a rightward direction. When the cursor 630 is gradually moved rightward and then located at a center of the second item 612 as shown in FIG. 11C, the image display apparatus 100 may maximize an image displayed on the second item 612 and minimize an image displayed on the first item 611.

Figure 11D:
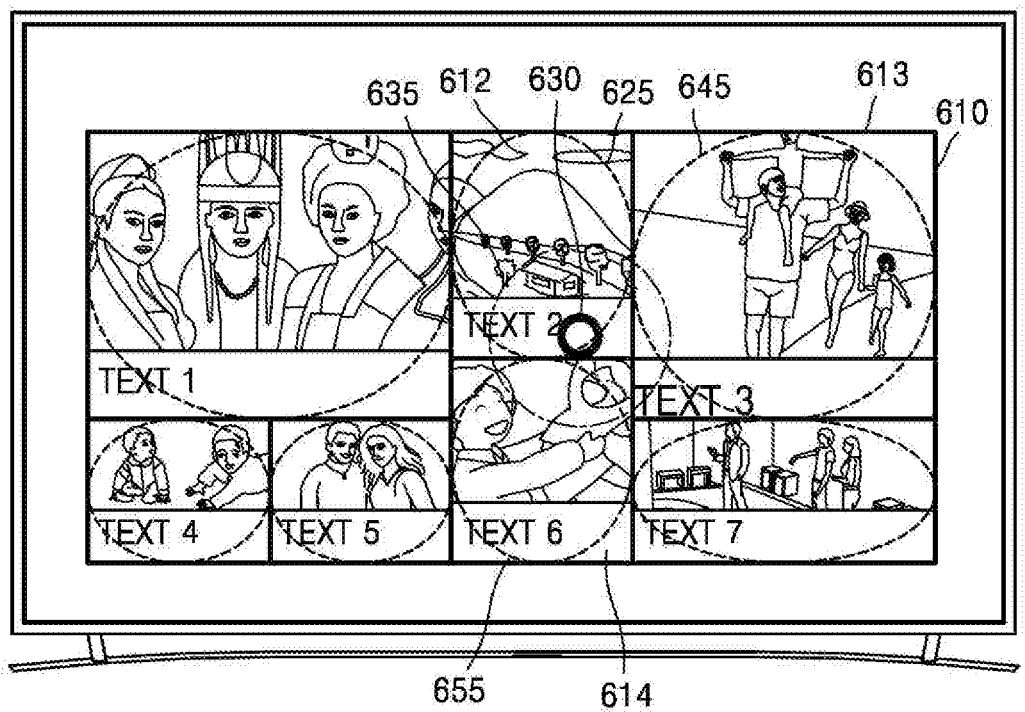
Figure 11D:
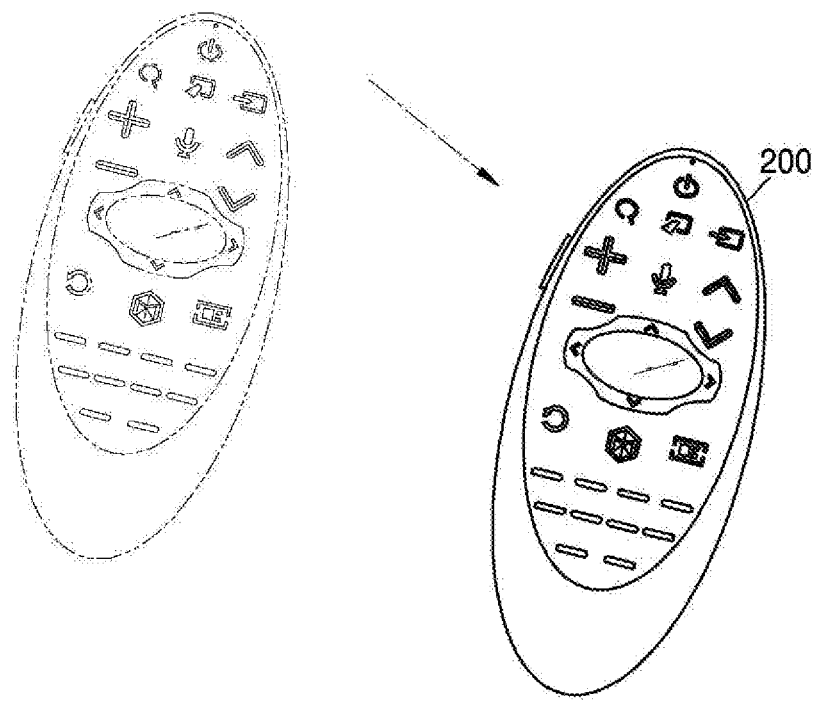

Alternatively, as shown in FIG. 11D, when a user input for moving the control apparatus 200 downward is detected, in response to the detected user input, the image display apparatus 100 may move the cursor 630 that is displayed on the display 120 in a downward direction. As the cursor 630 is moved downward (that is, as an overlapping extent of the first virtual area 635 and the virtual area 625 of the second item 612 decreases, and an overlapping extent of the first virtual area 635, a virtual area 645 of a third item 613, and a virtual area 655 of a fourth item 614 increases), the image display apparatus 100 may gradually decrease a size of an image displayed on the second item 612, and gradually increase sizes of images displayed on the third item 613 and the fourth item 614.

Figure 12A:
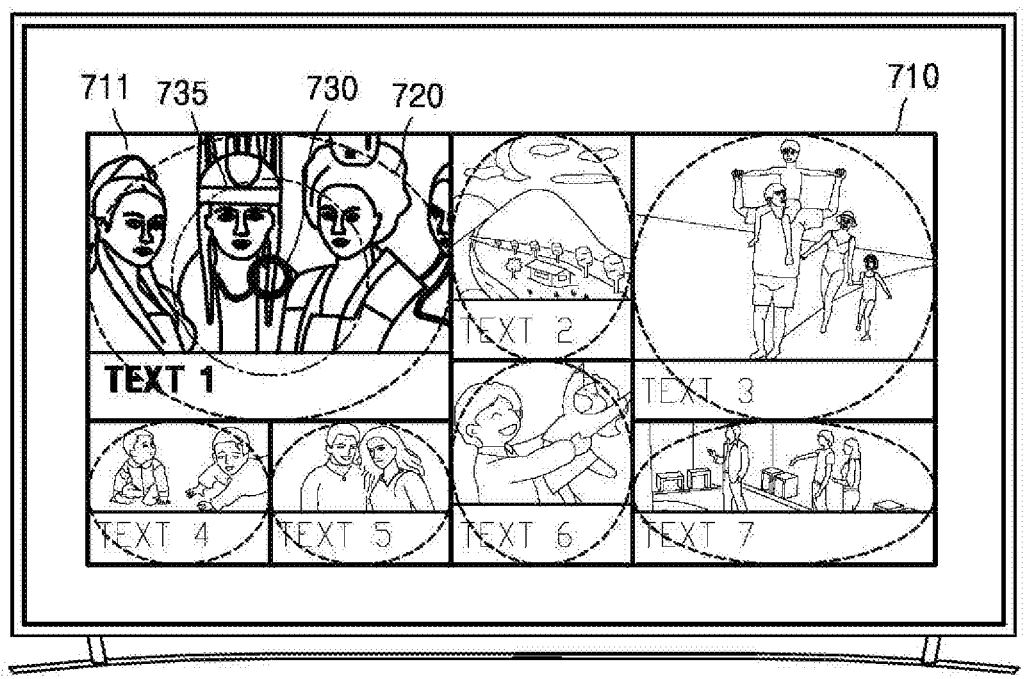
FIGS. 12A, 12B and 12C are diagrams of examples in which an opacity of content displayed on a plurality of items changes as a cursor moves, according to an exemplary embodiment.
Figure 12A:
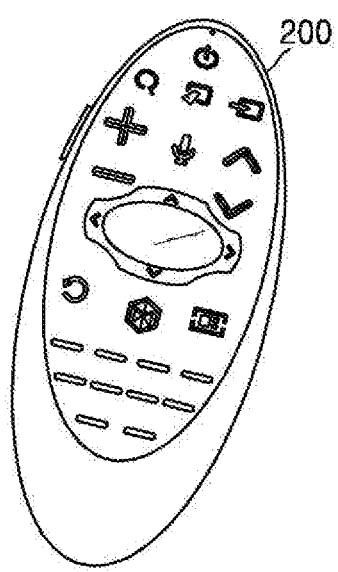
Figure 12B:
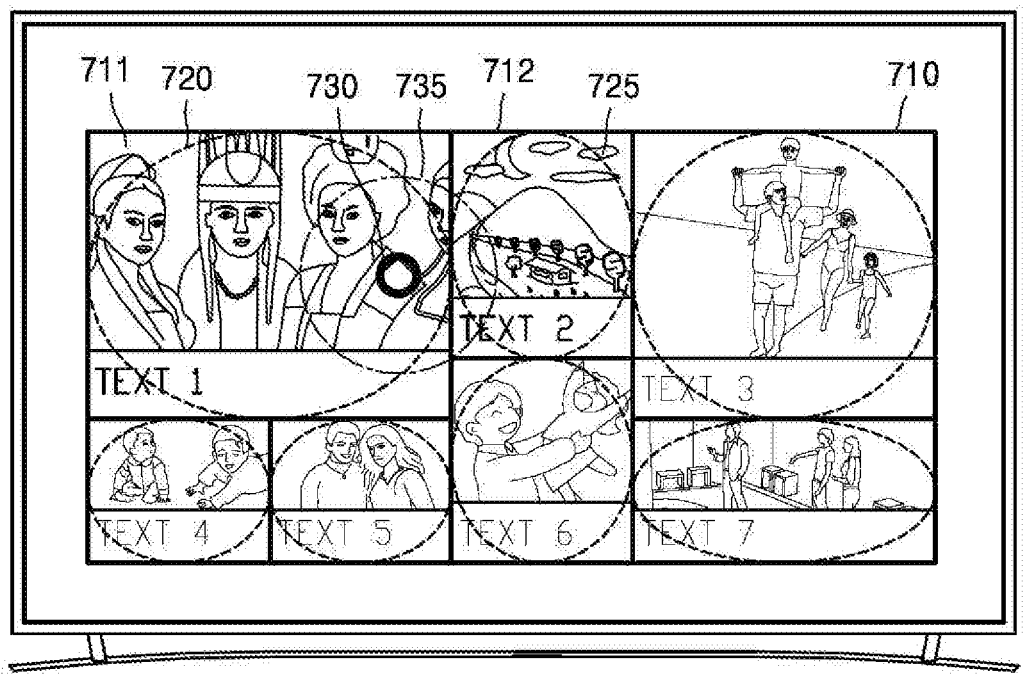
Figure 12B:
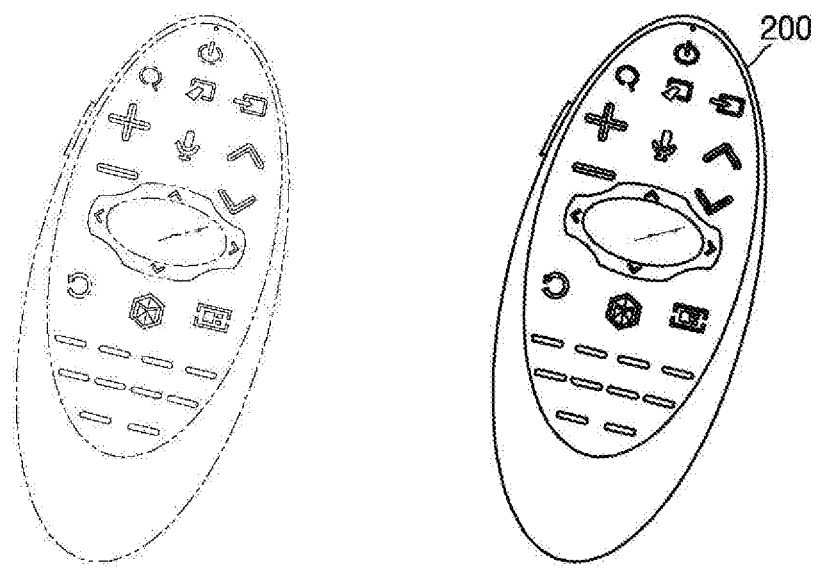
Figure 12C:
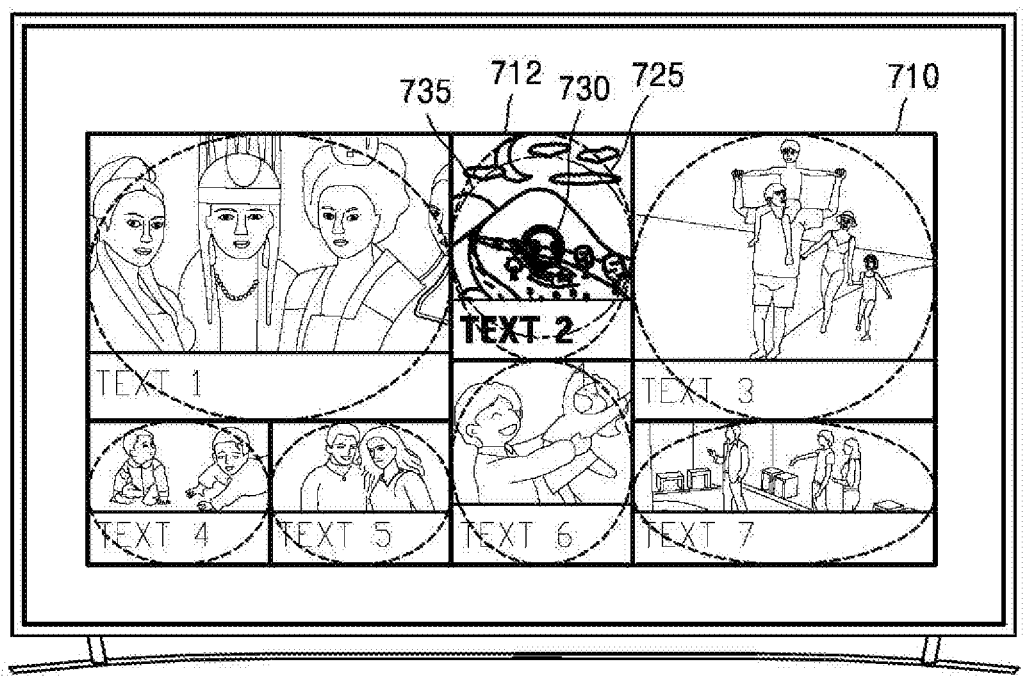
Figure 12C:
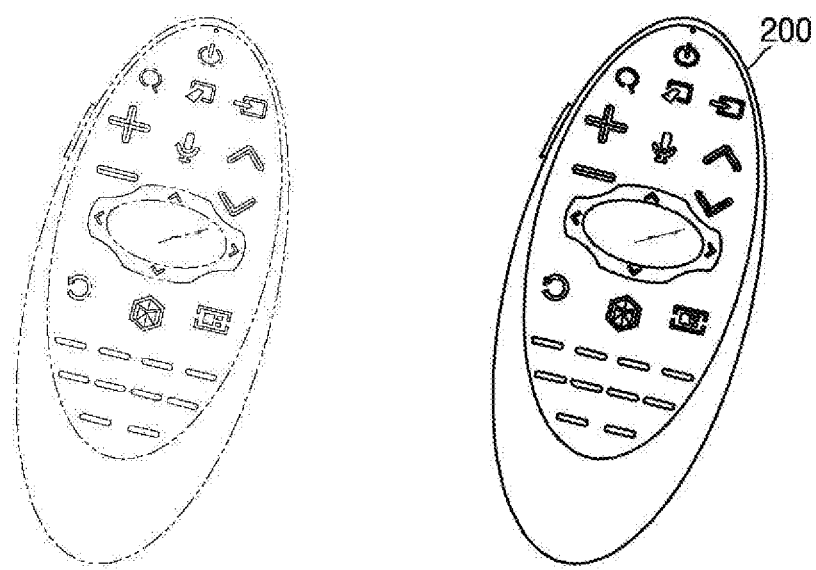

FIGS. 12A to 12C are diagrams of examples in which an opacity of content displayed on a plurality of items changes as a cursor moves, according to an exemplary embodiment.

Referring to FIG. 12A, the display 120 may display an item list 710 that includes a plurality of items. The plurality of items in the item list 710 may be arranged in horizontal and vertical directions, and each of the plurality of items may show content. Also, a virtual area may be set with respect to each of the plurality of items.

Also, the display 120 may display a cursor 730 that indicates a location of a user input, and the controller 110 may move the cursor 730 on the display 120 in response to a detected user input. For example, when a predetermined button of a user input unit of the control apparatus 200 is pressed or when the control apparatus 200 detects a movement of a motion sensor (an acceleration sensor or a gyro sensor), the control apparatus 200 may transmit a certain key input to the image display apparatus 100. When the controller 110 receives a certain key input via the control apparatus 200, the controller 110 may display the cursor 730 on the display 120. Also, a virtual area 735 may be set with respect to the cursor 730.

As shown in FIG. 12A, when the cursor 730 is at a center of a first item 711 from among the plurality of items in the item list 710 (when a first parameter (transnear) of the first item 711 is 1), an opacity of an image displayed on the first item 711 may have a maximum value.

Since virtual areas respectively set with respect to items other than the first item 711 do not overlap a virtual area that is set with respect to the cursor 730 (first parameters (transnears) of the items other than the first item 711 are 0), opacities of images respectively displayed in the items other than the first item 711 may have a minimum value.

As shown in FIG. 12B, when a user input for moving the control apparatus 200 rightward is detected, the image display apparatus 100 may move the cursor 730 displayed on the display 120 in a rightward direction in response to the user input. Alternatively, the image display apparatus 100 may move the cursor 730 on the display 120 according to a direction of a touch input detected on a touch panel of the control apparatus 200.

As the cursor 730 is moved rightward (that is, as an overlapping extent of the virtual area 735 that is set with respect to the cursor 730 and a virtual area 720 that is set in the first item 711 decreases, and an overlapping extent of the virtual area 735 and a virtual area 725 that is set with respect to a second item 712 located at a right side of the first item 711 increases), the image display apparatus 100 gradually decreases an opacity of an image displayed on the first item 711, and gradually increases an opacity of an image displayed on the second item 712.

Also, when a user input for gradually moving the control apparatus 200 rightward is detected, the image display apparatus 100 may gradually move the cursor 730 displayed on the display 120 in a rightward direction in response to the user input. As shown in FIG. 12C, when the cursor 730 is gradually moved rightward and stops at a center of the second item 712, the image display apparatus 100 may maximize the opacity of the image displayed on the second item 712 and minimize the opacity of the image displayed on the first item 711.

Although an item is displayed by using a single image in FIGS. 12A to 12C, an item may be displayed by using a synthesized image of first and second images. According to an exemplary embodiment, the image display apparatus 100 may change opacities of first and second images based on a first parameter (transnear) of the item. For example, when a first parameter of the first item 711 is 1 (in the case of FIG. 12A), the image display apparatus 100 may maximize the opacity of the first image and minimize an opacity of the second image (e.g., 0). Accordingly, the first item 711 may be displayed by using the first image. Alternatively, when the first parameter (transnear) decreases (in the case of FIG. 12B), the image display apparatus 100 may gradually decrease the opacity of the first image and gradually increase the opacity of the second image. Alternatively, when the first parameter of the first item 711 is 0 (in the case of FIG. 12C), the image display apparatus 100 may minimize the opacity of the first image (e.g., 0), and maximize the opacity of the second image. Accordingly, the first item 711 may be displayed by using the second image.

Figure 13A:
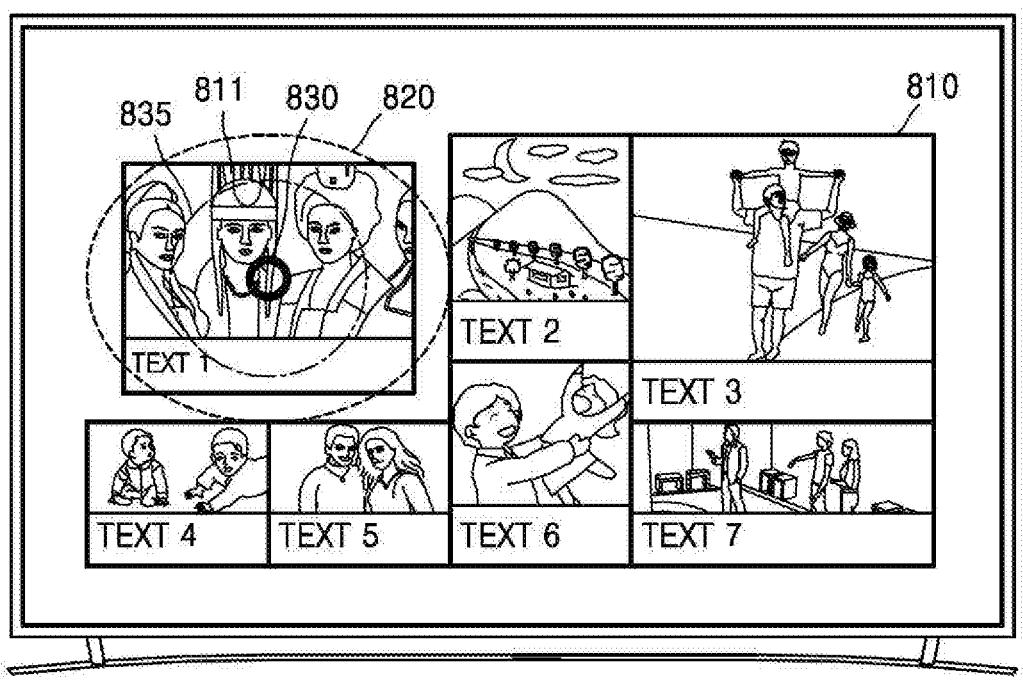
FIGS. 13A, 13B and 13C are diagrams of examples in which sizes of a plurality of items change as a cursor moves, according to an exemplary embodiment.
Figure 13A:
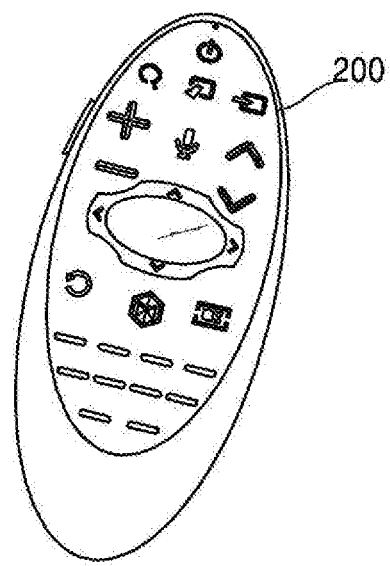
Figure 13B:
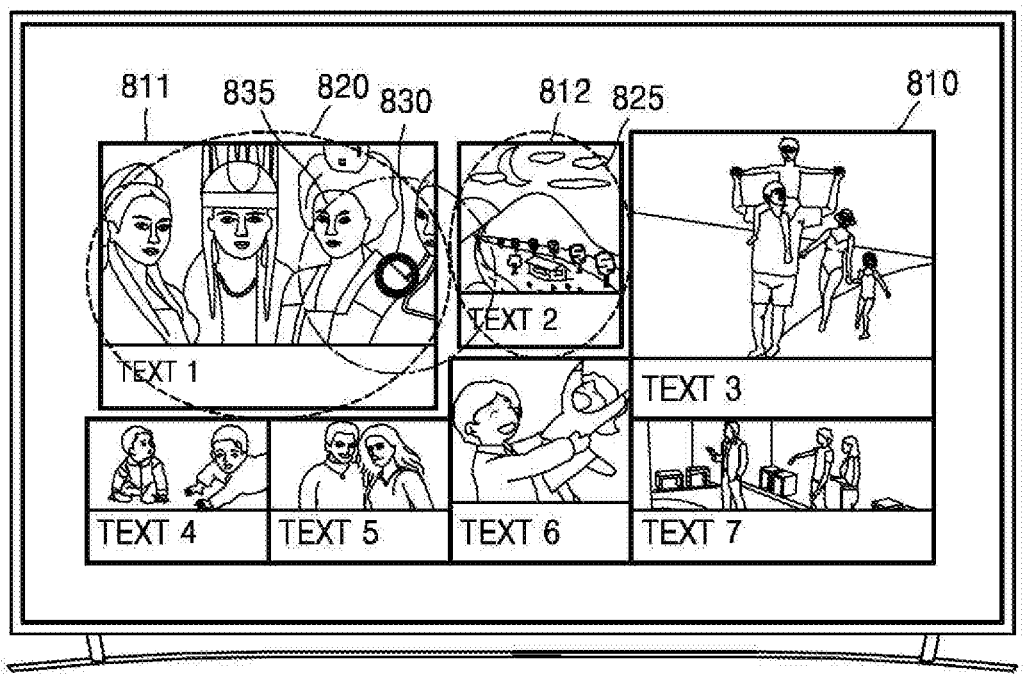
Figure 13B:
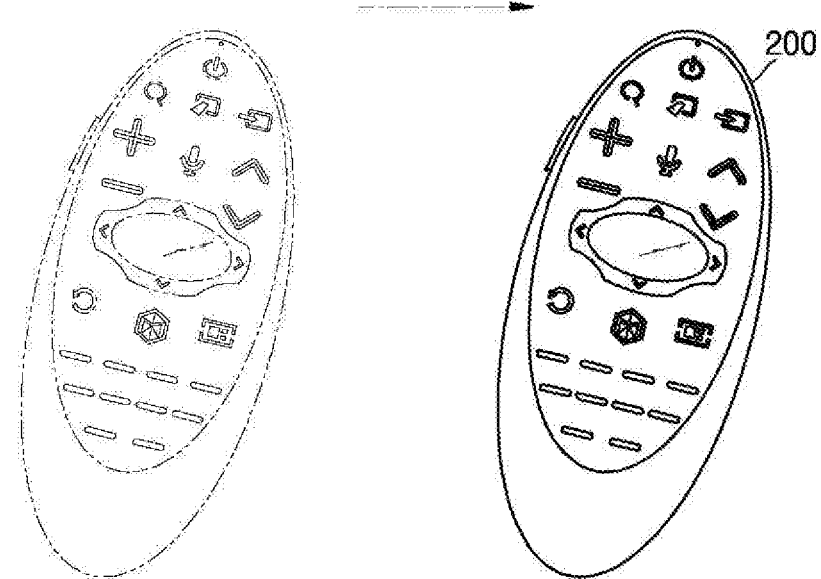
Figure 13C:
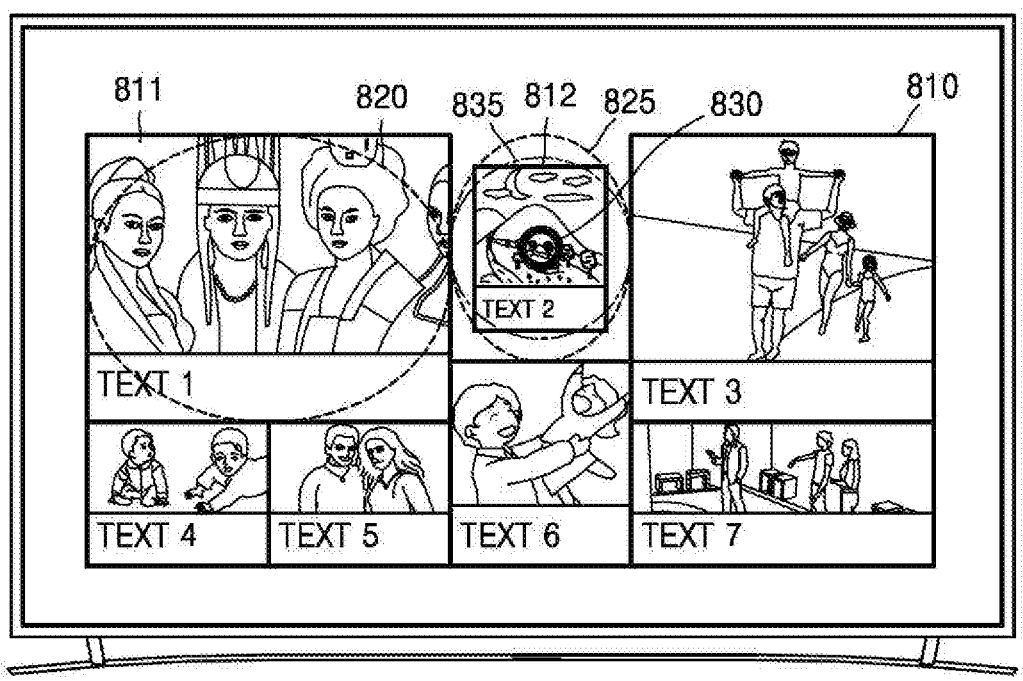
Figure 13C:
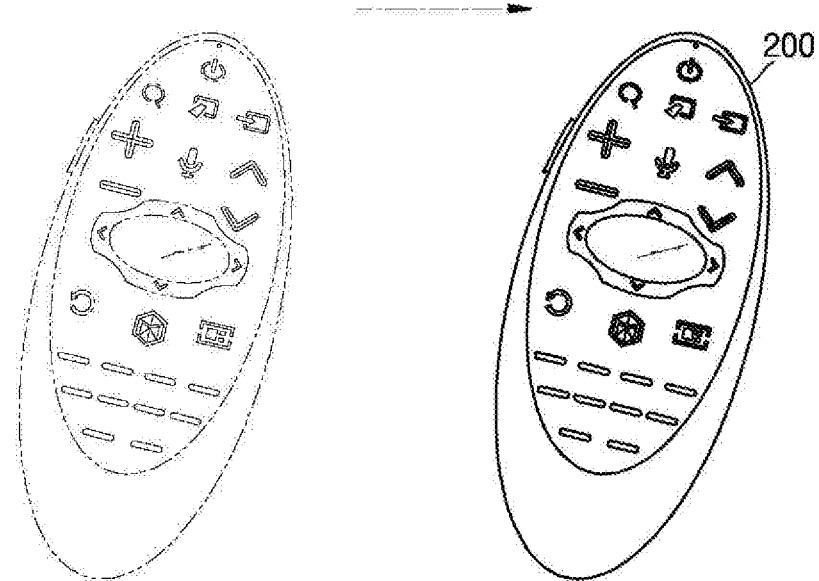

FIGS. 13A to 13C are diagrams of examples in which sizes of a plurality of items change as a cursor moves, according to an exemplary embodiment.

Referring to FIG. 13A, the display 120 may display an item list 810 that includes a plurality of items. The plurality of items in the item list 810 may be arranged in horizontal and vertical directions, and each of the plurality of items may show content. Also, a virtual area may be set with respect to each of the plurality of items.

Also, the display 120 may display a cursor 830 that indicates a location of a user input, and the controller 110 may move the cursor 830 on the display 120 in response to a detected user input. For example, when a predetermined button of a user input unit of the control apparatus 200 is pressed or when the control apparatus 200 detects a movement of a motion sensor (an acceleration sensor or a gyro sensor), the control apparatus 200 may transmit a certain key input to the image display apparatus 100. When the controller 110 receives a certain key input via the control apparatus 200, the controller 110 may display the cursor 830 on the display 120. Also, a virtual area 835 may be set with respect to the cursor 830.

As shown in FIG. 13A, when the cursor 830 is at a center of a first item 811 having a virtual area 820 set with respect to the first item 811 from among the plurality of items in the item list 810 (that is, when a first parameter (transnear) of the first item 811 is 1), a size of the first item 811 may be minimized. On the other hand, since virtual areas respectively set with respect to items other than the first item 811 do not overlap a virtual area that is set with respect to the cursor 830 (that is, first parameters (transnears) of the items other than the first item 811 are 0), sizes of the items other than the first item 811 may be maximized.

As shown in FIG. 13B, when a user input for moving the control apparatus 200 rightward is detected, the image display apparatus 100 may move the cursor 830 on the display 120 in a rightward direction in response to the detected user input.

As the cursor 830 is moved rightward (that is, as an overlapping extent of the virtual area 835 that is set with respect to the cursor 830 and the virtual area that is set with respect to the first item 811 decreases, and an overlapping extent of the virtual area 835 and a virtual area 825 that is set with respect to a second item 812 located at a right side of the first item 811 increases), the image display apparatus 100 may gradually increase a size of the first item 811 and gradually decrease a size of the second item 812.

When a user input for gradually moving the control apparatus 200 rightward is detected, in response to the detected user input, the image display apparatus 100 may gradually move the cursor 830 on the display 120 in a rightward direction. When the cursor 830 is gradually moved rightward and then located at a center of the second item 812 as shown in FIG. 12C, the size of the second item 812 may be minimized, and a size of the first item 811 may be maximized.

Figure 14:
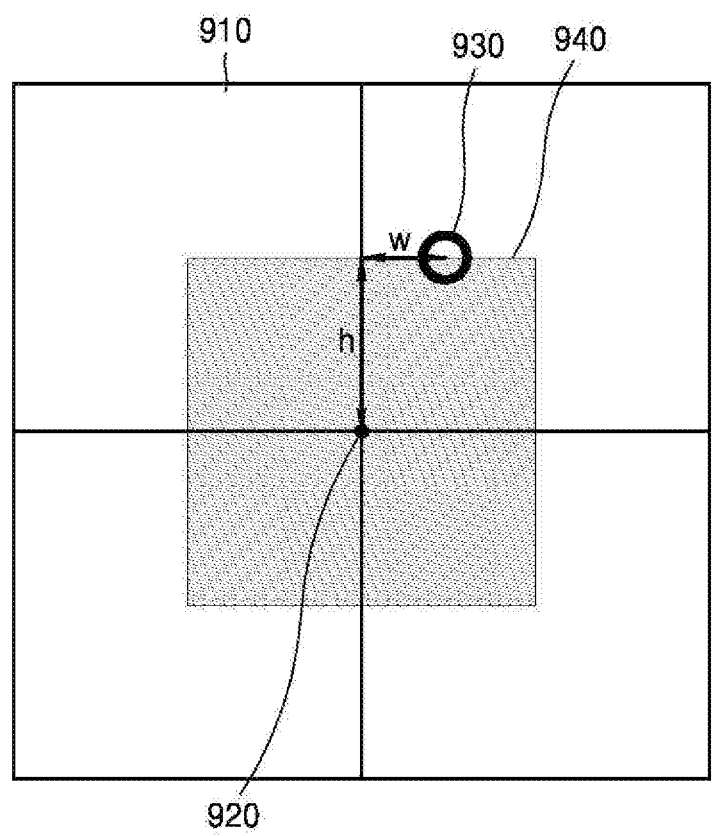
FIG. 14 is a diagram for describing a second parameter (transinner) that is used to change properties of items, according to an exemplary embodiment item.

FIG. 14 is a diagram for describing a second parameter (transinner) that is used to change properties of items, according to an exemplary embodiment item.

According to an exemplary embodiment, the second parameter (transinner) may be a parameter for determining properties of items, or a parameter for changing properties of text displayed on the second area 422 that is described with reference to FIG. 7A. However, the second parameter is not limited thereto, and the second parameter may be used for content that is displayed in the first area 421.

According to an exemplary embodiment, when an item is not highlighted (when the item is not Fovea), a second parameter (transinner) of the item is 0. That is, items on which a cursor 930 is not located have a second parameter (transinner) of 0.

Referring to FIG. 14, a second parameter (transinner) of an item (Fovea) 910, on which the cursor 930 is located, may be determined according to a location of the cursor 930. For example, a virtual area 940 (hereinafter, referred to as "third virtual area" 940 may be set with respect to the cursor 930 according to the location of the cursor 930, and the second parameter (transinner) may be determined according to a ratio between a size of the third virtual area 940 and a size of the item 910.

According to an exemplary embodiment, the third virtual area 940 may be shaped similarly to the item 910. For example, when the item 910 is quadrilateral-shaped, the third virtual area 940 may also have the same quadrilateral shape, and a ratio between a width and a height of the item 910 may be the same as a ratio between a width and a height of the third virtual area 940.

According to an exemplary embodiment, the image display apparatus 100 may determine the width and the height of the third virtual area 940 based on a method shown in Table 1.

TABLE 1

Cursor Position : (C.x, C.y)
Item Center Position : (Ic.x, Ic.y)
Item(quadrilateral) Width / Height = ItemWid / ItemHei
third virtual area (quadrilateral) Width / Height = Wid / Hei
w = |C.x − Ic.x|;
h = |C.y − Ic.y|;
if(w/ItemWid > h/ItemHei){
   Wid = 2w;
   Hei = ItemHei * ( 2w / ItemWid )
}
else{
   Wid = ItemWid * ( 2h / ItemHei )
   Hei = 2h;
}

Referring to Table 1 and FIG. 14, the image display apparatus 100 may calculate a horizontal distance w and a vertical distance h between the cursor 930 and a center of the item 910, and determine a size of the third virtual area 940 based on whichever is larger among a ratio between the horizontal distance w and a width of the item 910 and a ratio between the vertical distance h and a height of the item 910.

For example, when the ratio between the vertical distance h and the height of the item 910 is larger than the ratio between the horizontal distance w and the width of the item 910 as shown in FIG. 14, the size of the third virtual area 940 may be determined based on the vertical distance h. For example, when the vertical distance h is 50, a height (Hei) of the third virtual area 940 is 100. Also, since a width (Wid) of the third virtual area 940 is calculated by [(width of item)*(2*h/height of item)], the width is 100.

According to an exemplary embodiment, the second parameter (transinner) may be calculated by [1−(size of third virtual area/size of item)^0.5]. The second parameter (transinner) may range from 0 to 1. For example, when a width and a height of an item are 400, and a width and a height of a determined third virtual area is 100, a second parameter (transinner) of the item is 0.75.

Since the second parameter (transinner) is calculated by [1−(size of third virtual area/size of item)^0.5], the second parameter (transinner) may range from 0 to 1.

Figure 15:
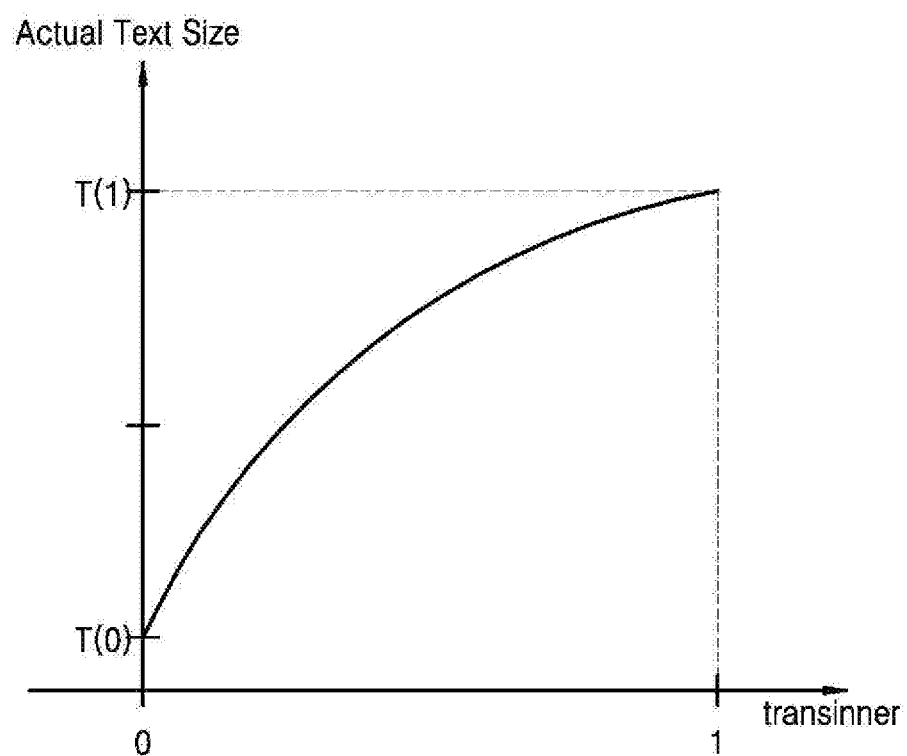
FIG. 15 is a graph of a size of content displayed on an item with respect to a second parameter (transinner), according to an exemplary embodiment.

FIG. 15 is a graph of a size of content displayed on an item with respect to a second parameter (transinner), according to an exemplary embodiment.

Referring to FIG. 15, an x-axis of the graph indicates a second parameter (transinner), and a y-axis of the graph indicates a size of an image in an item. For example, the content displayed on the item may be text, for example, the text displayed in the second area 422 described with reference to FIG. 7.

According to an exemplary embodiment, text displayed on items may have a maximum size of T(1) and a minimum size of T(0). Therefore, sizes of the text displayed on the items may range from T(0) to T(1). Also, based on the description of FIG. 14, second parameters (transinners) of the items may range from 0 to 1.

According to an exemplary embodiment, when a cursor is located at a center of an item, text that is displayed on a highlighted item (Fovea) may be maximized and displayed. That is, when a second parameter of the item is 1, a size of the text displayed on the item may be set to T(1). On the other hand, when the cursor is located at a periphery of the item, the text displayed on the item may be minimized. That is, when the second parameter of the item is 0, the size of the text displayed on the item may be set to T(0).

According to an exemplary embodiment, the image display apparatus 100 may change a size of content displayed on a highlighted item (Fovea) based on the graph shown in FIG. 15. However, the graph of FIG. 15 is only an exemplary embodiment, and other graphs, including linear and non-linear graphs, may alternatively be used to change the size of content. The image display apparatus 100 may change sizes of the text displayed on the plurality of items based on various graphs that show sequential changes of the sizes of the text in the items from T(0) to T(1), as the second parameter (transinner) changes between 0 and 1.

Also, although the graph of FIG. 15 is described as a graph for determining sizes of texts (content) included in a plurality of items according to second parameters (transinners), the graph of FIG. 15 may also be used as a graph for determining sizes of the items, and opacities, colors, and locations of content displayed in the items.

FIGS. 16A, 16B, 16C, 16D and 16E are diagrams of examples in which a size of text displayed on a plurality of items changes as a cursor moves, according to an exemplary embodiment.

Figure 16A:
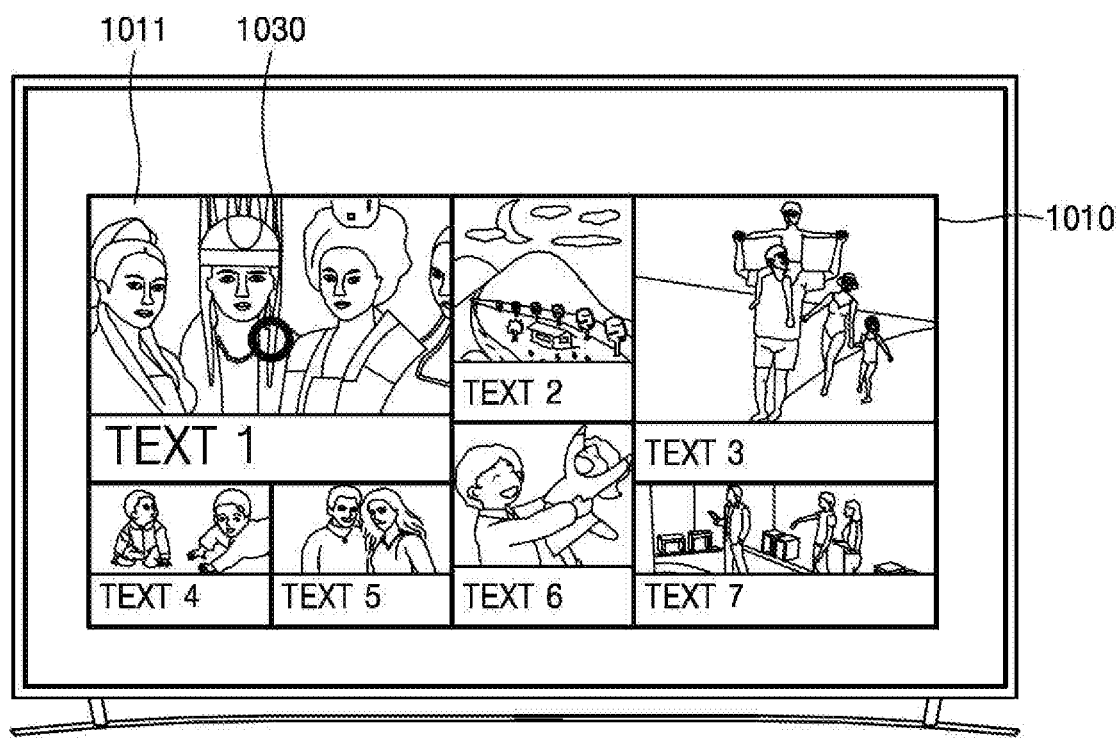
FIGS. 16A, 16B, 16C, 16D and 16E are diagrams of examples in which a size of text displayed on a plurality of items changes as a cursor moves, according to an exemplary embodiment.
Figure 16A:
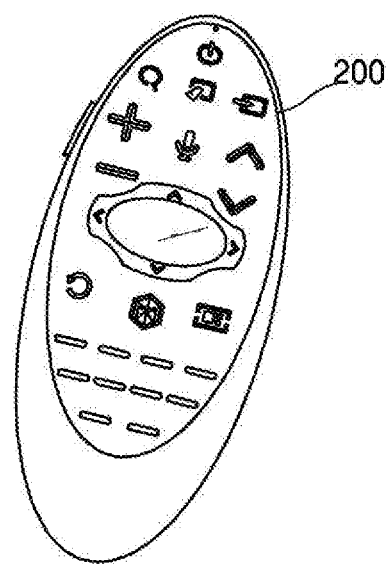

Referring to FIG. 16A, the display 120 may display an item list 1010 that includes a plurality of items. The plurality of items in the item list 1010 may be arranged in horizontal and vertical directions, and each of the plurality of items may show content.

Also, the display 120 may display a cursor 1030 that indicates a location of a user, and the controller 110 may move the cursor 1030 on the display 120 in response to a detected user input. For example, when a predetermined button of a user input unit of the control apparatus 200 is pressed or when the control apparatus 200 detects a movement of a motion sensor (an acceleration sensor or a gyro sensor), the control apparatus 200 may transmit a certain key input to the image display apparatus 100. When the controller 110 receives a certain key input via the control apparatus 200, the controller 110 may display the cursor 1030 on the display 120.

As shown in FIG. 16A, when the cursor 1030 is at a center of a first item 1011 from among the plurality of items in the item list 1010 (when a second parameter of the first item 1011 is 1), text (TEXT 1) displayed on the first item 1011 may be maximized, for example, T(1) that is described with reference to the graph of FIG. 15.

On the other hand, since items other than the first item 1011 are not highlighted items (not Fovea), second parameters (transinners) of the items other than the first item 1011 are 0, and a size of text (e.g., TEXT 2, TEXT 3, TEXT 4, TEXT 5, TEXT 6, TEXT 7) displayed on the items other than the first item 1011 may be decreased to a minimum size (T(0) shown in the graph of FIG. 15) of the text in each item.

Figure 16B:
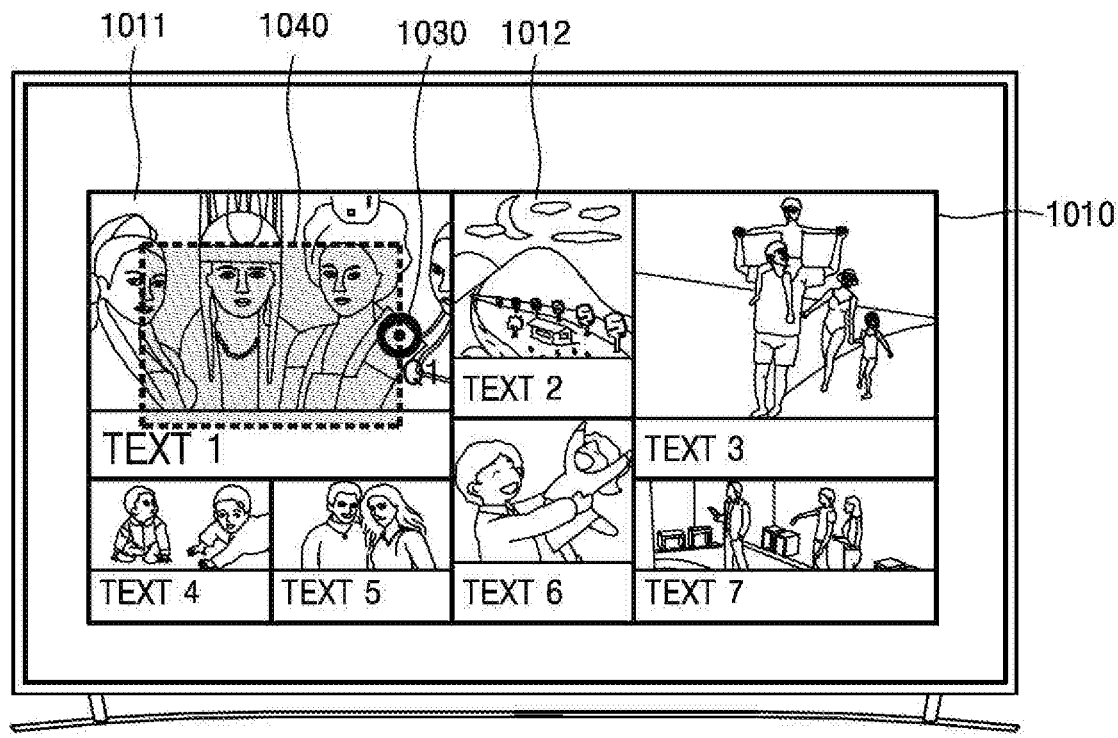
Figure 16B:
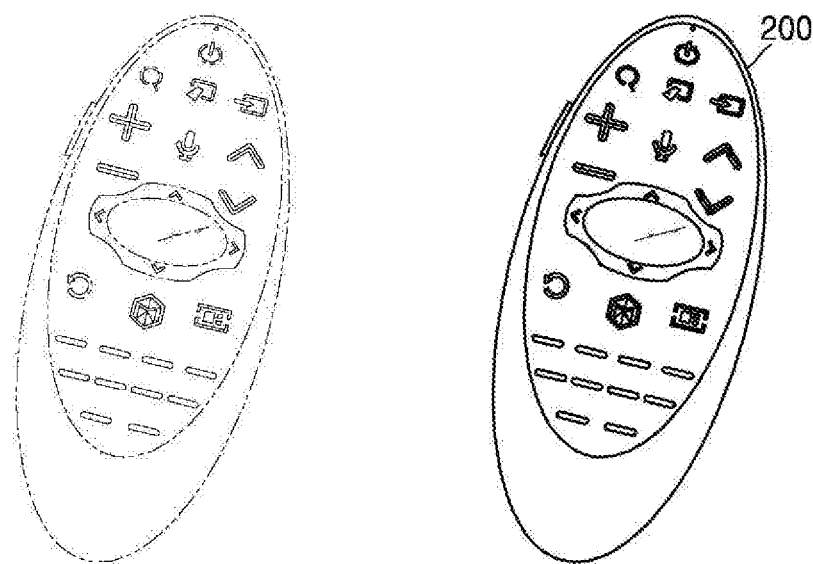

As shown in FIG. 16B, when a user input for moving the control apparatus 200 rightward is detected, the image display apparatus 100 may move the cursor 1030 on the display 120 in a rightward direction in response to the detected user input.

When the cursor 1030 is moved rightward and a center of the cursor 1030 is located at a first point Q1, a virtual quadrilateral area (third virtual area) 1040 having a first size may be set, as described with reference to FIG. 14. A second parameter (transinner) of the first item 1011 may be determined according to a ratio between the first size of the virtual quadrilateral area 1040 and a size of the first item 1011. Also, a size of the text (TEXT 1) shown in the first item 1011 may be determined according to the second parameter. The text (TEXT 1) shown in FIG. 16B may be smaller than the text (TEXT 1) shown in FIG. 16A.

Also, as the cursor 1030 is moved rightward (that is, as a size of the virtual quadrilateral area 1040 that is determined according to a location of the cursor 1030 gradually increases, and the second parameter (transinner) gradually decreases), the image display apparatus 100 may gradually decrease the size of the text (TEXT 1) shown on the first item 1011.

Figure 16C:
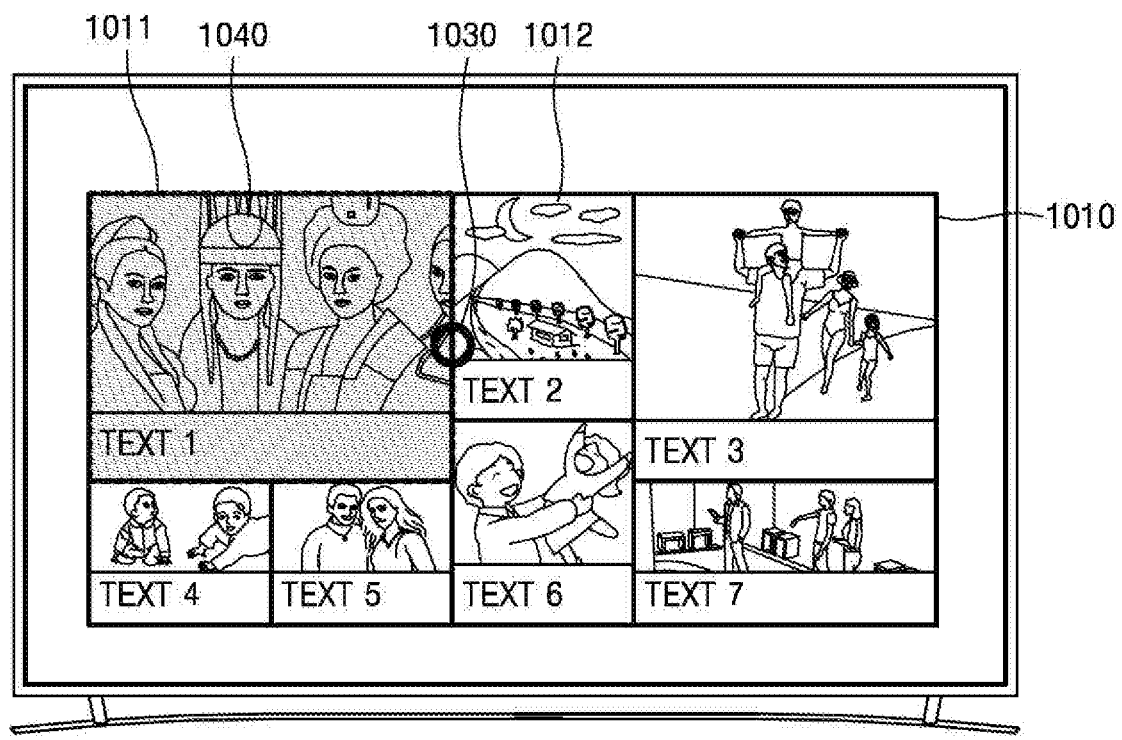
Figure 16C:
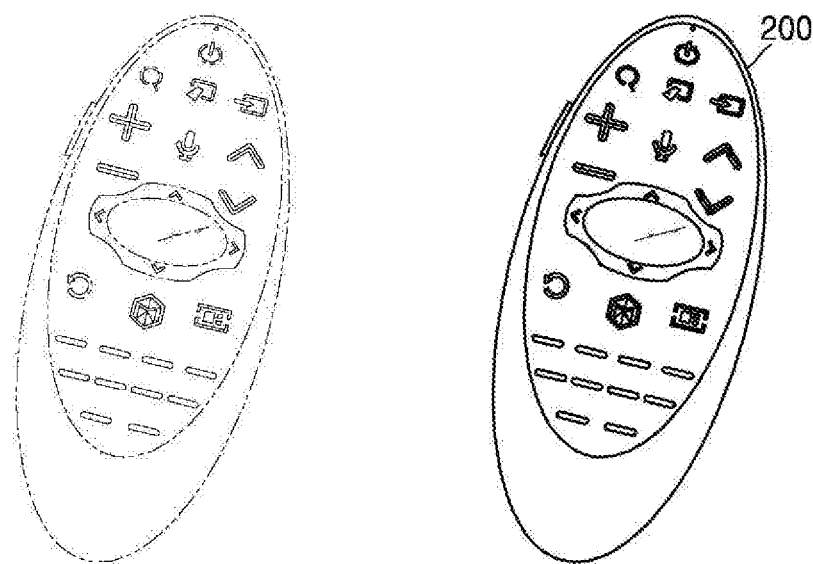

Also, when the cursor 1030 is gradually moved rightward and then located at a boundary between the first item 1011 and a second item 1020 as shown in FIG. 16C, the size of the virtual quadrilateral area 1040 may be the same as the size of the first item 1011. Accordingly, the second parameter may be 0, and the image display apparatus 100 may decrease the text (TEXT 1) shown on the first item 1011 to a minimum size (T(0)).

Figure 16D:
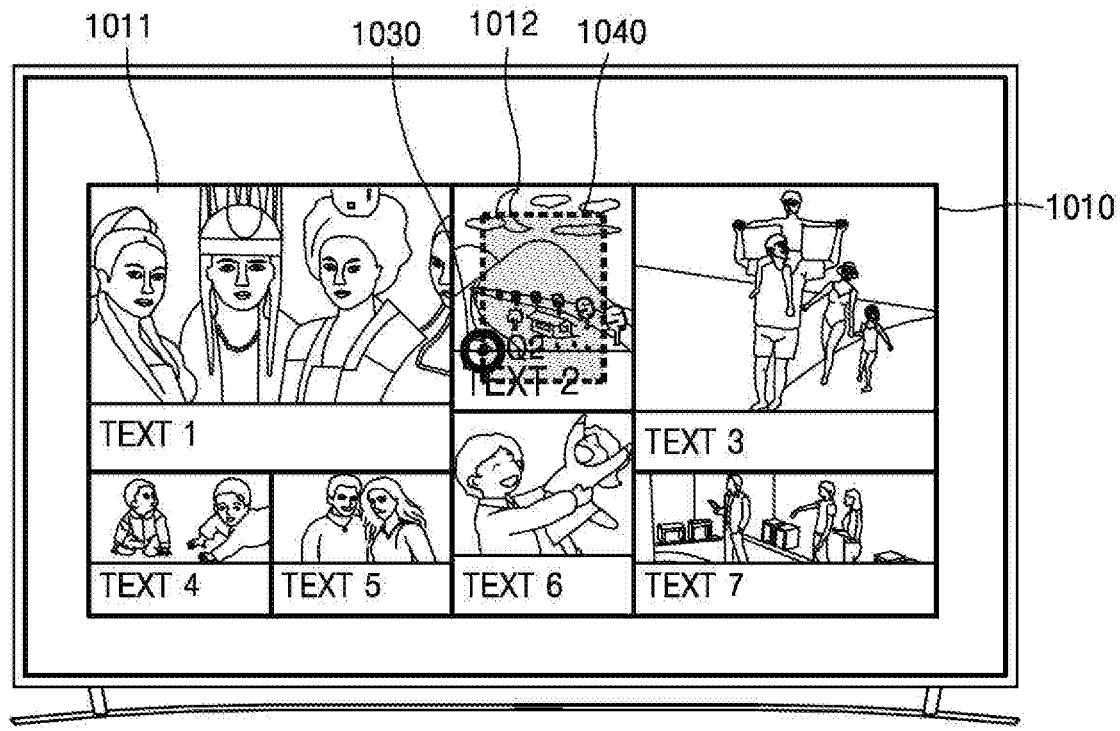
Figure 16D:
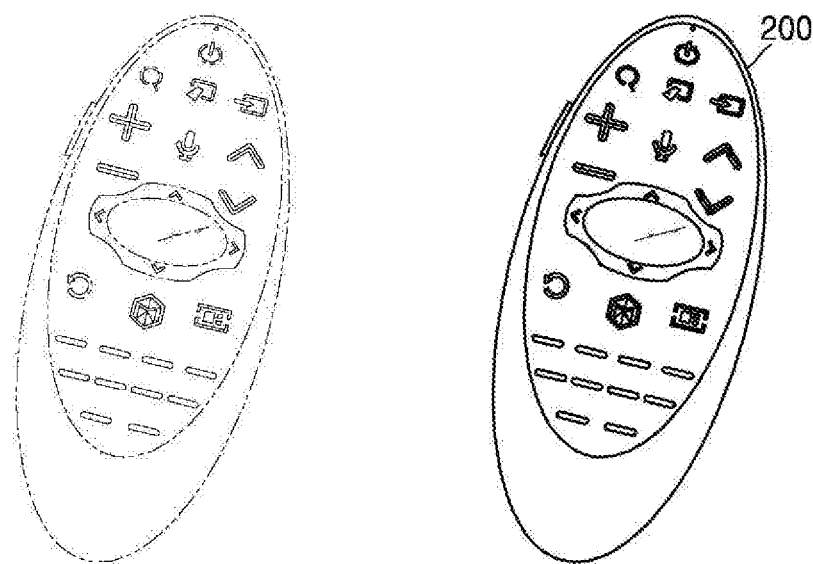

Also, when the cursor 1030 is gradually moved rightward and then located at a second point Q2 in the second item 1020 as shown in FIG. 16D, a virtual quadrilateral area (third virtual area) 1040 having a second size may be set, as described with reference to FIG. 14. A second parameter (transinner) of the second item 1012 may be determined according to a ratio between the second size of the virtual quadrilateral area 1040 and a size of the second item 1012. Also, a size of text (TEXT 2) shown in the second item 1012 may be determined according to the second parameter. The text (TEXT 2) shown in FIG. 16D may be larger than the text (TEXT 2) shown in FIGS. 16A to 16C.

Since the first item 1011 is not a highlighted item, a second parameter of the first item 1011 is 0. Accordingly, the text (TEXT 1) shown on the first item 1011 may have a minimum size (T(0)).

Figure 16E:
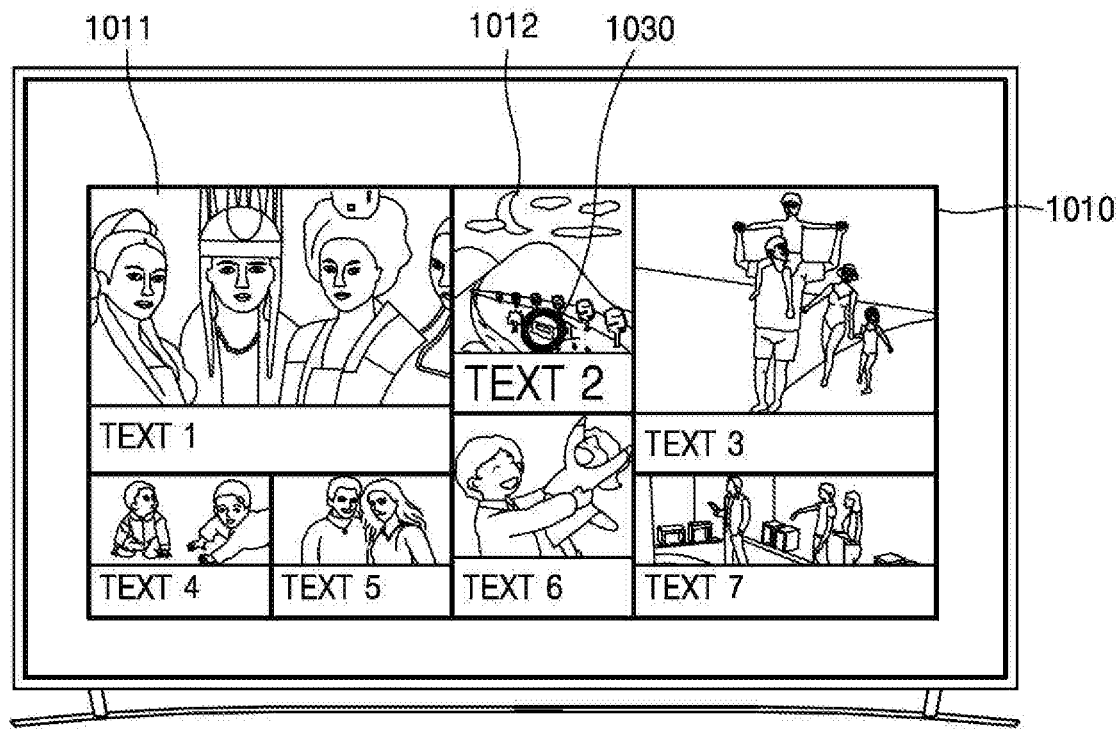
Figure 16E:
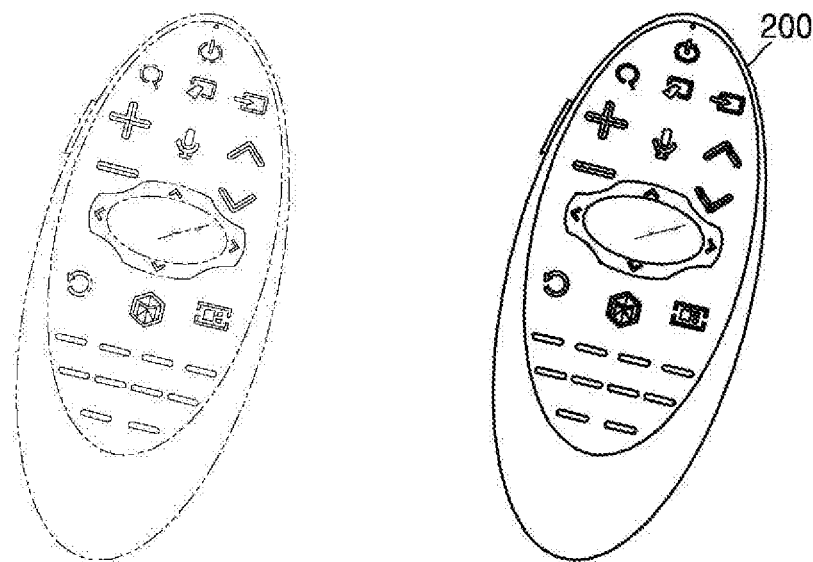

Also, when the cursor 1030 is moved gradually rightward and located at a center of the second item 1012 as shown in FIG. 16E (when the second parameter of the second item 1012 is 1), the text (TEXT 2) shown on the second item 1012 may have a maximum size (T(1)).

Figure 17:
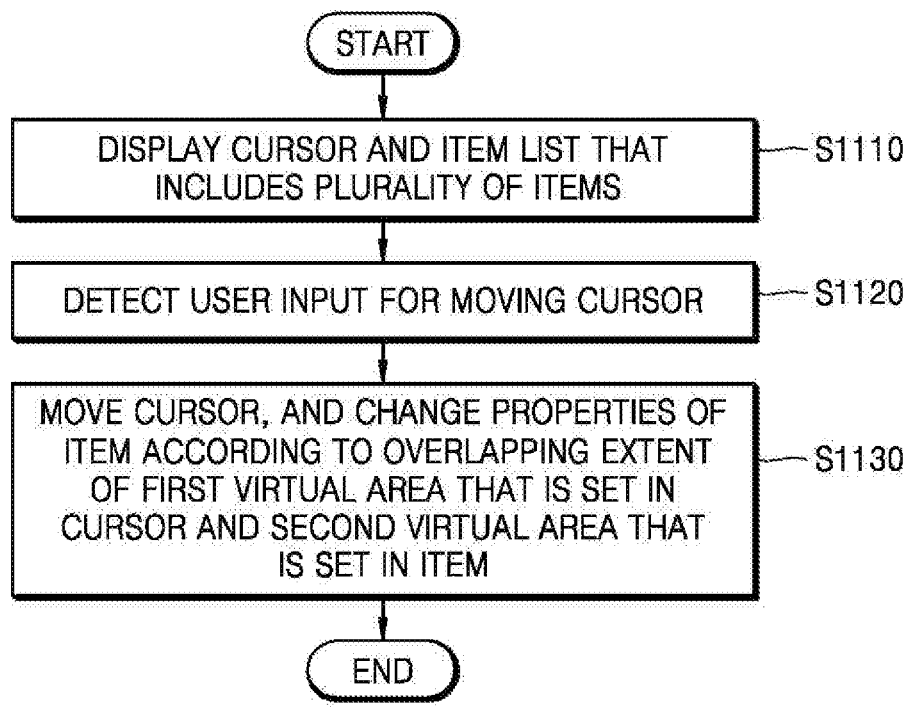
FIG. 17 is a flowchart of an image display method according to an exemplary embodiment.

FIG. 17 is a flowchart of an image display method according to an exemplary embodiment.

Referring to FIG. 17, the image display apparatus 100 may display an item list that includes a plurality of items and a cursor that indicates a location of a user input on the display 120 in operation S1110.

For example, the item list according to an exemplary embodiment may include a plurality of items that show content. Also, the plurality of items in the item list may be arranged in horizontal and vertical directions.

Also, when a certain key input is received via the control apparatus 200, the image display apparatus 100 may display the cursor on the display 120.

The image display apparatus 100 may detect a user input for moving the cursor in operation S1120.

For example, the image display apparatus 100 may detect a user input for moving or tilting the control apparatus 200 upward, downward, leftward, or rightward.

In response to the user input, the image display apparatus 100 may move the cursor on the display 120, and change properties of at least one item from among the plurality of items according to an overlapping extent of a first virtual area that is set in the cursor and a second virtual area that is set in the at least one item in operation S1130.

For example, the image display apparatus 100 may detect a moving direction and a moving extent of the control apparatus 200, and move the cursor on the display 120 according to a detected movement. When the cursor is located in any one of the plurality of items, that item may be highlighted.

Also, the image display apparatus 100 may gradually change properties of an item according to an overlapping extent of the first virtual area of the cursor and the second virtual area of the item. For example, the image display apparatus 100 may change a size of an item, may increase or decrease a size of content (e.g., an image or text) displayed on the item, or may change an opacity, a color, or a location of the content displayed on the item.

Figure 18:
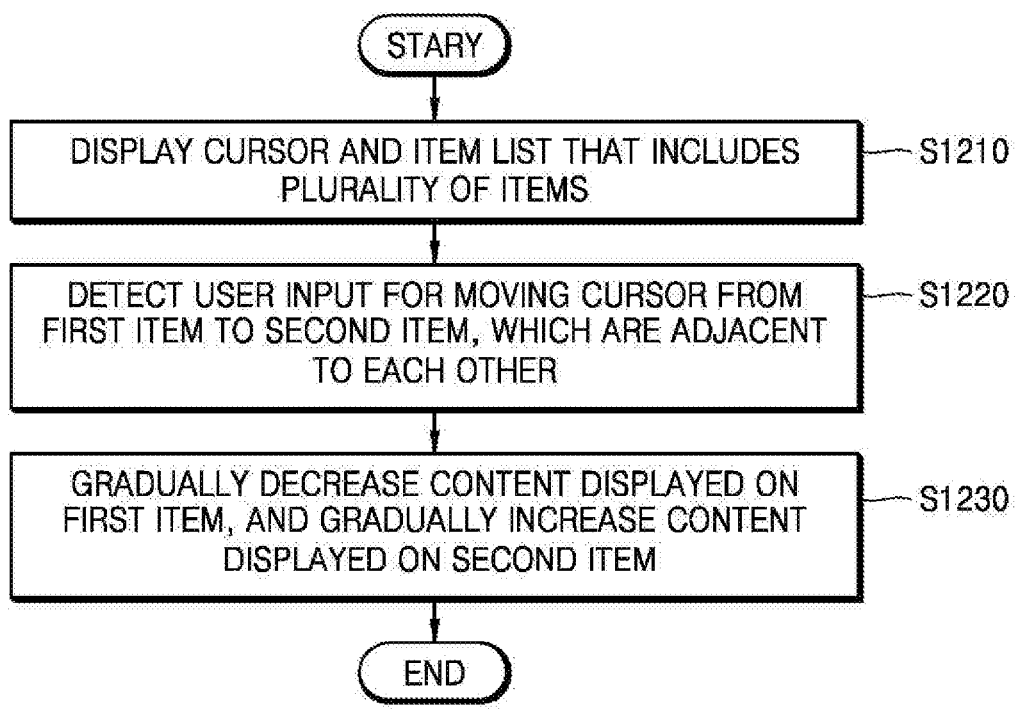
FIG. 18 is a flowchart of an image display method according to an exemplary embodiment.

FIG. 18 is a flowchart of an image display method according to an exemplary embodiment.

Referring to FIG. 18, the image display apparatus 100 may display an item list that includes a plurality of items and a cursor that indicates a location of a user input on the display 120 in operation S1210.

Since the operation S1210 of FIG. 18 corresponds to the operation S1110 of FIG. 17, a detailed description of the operation 1210 will be omitted.

The image display apparatus 100 may detect a user input for moving the cursor from a first item to a second item, which are adjacent to each other from among the plurality of items in the item list in operation S1220.

For example, the image display apparatus 100 may detect a user input for moving the cursor from a center of the first item to a center of the second item.

The image display apparatus 100 may gradually decrease content displayed on the first item and gradually increase content displayed on the second item in operation S1230.

For example, when the cursor is located at the center of the first item (when an overlapping extent of a virtual area of the first item and a virtual area of the cursor is maximized), the image display apparatus 100 may maximize the content shown in the first item. Also, when the cursor is moved from the center of the first item to the center of the second item, the image display apparatus 100 may gradually decrease the content displayed in the first item.

Alternatively, when the cursor is moved from the center of the first item to the center of the second item, the image display apparatus 100 may gradually enlarge the content displayed in the second item so that the content in the second item is maximized when the cursor is located at the center of the second item (when an overlapping extent of a virtual area of the second item and the virtual area of the cursor is maximized).

Figure 19:
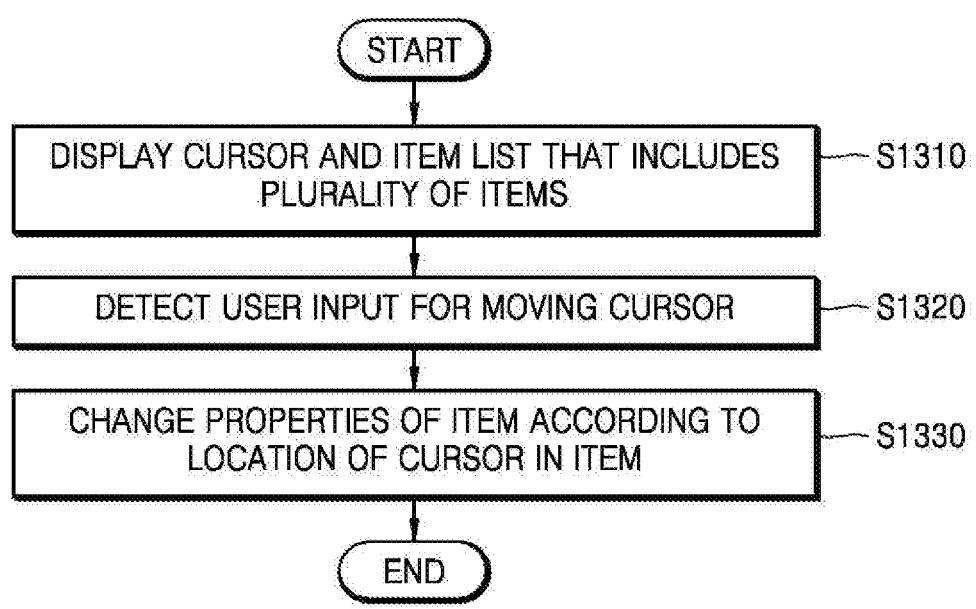
FIG. 19 is a flowchart of an image display method according to an exemplary embodiment.

FIG. 19 is a flowchart of an image display method according to an exemplary embodiment.

Referring to FIG. 19, the image display apparatus 100 may display an item list that includes a plurality of items and a cursor that indicates a location of a user input on the display 120 in operation S1210.

The image display apparatus 100 may detect a user input for moving the cursor in operation S1320.

Since the operation S1310 of FIG. 19 corresponds to the operation S1110 of FIG. 17 and the operation S1320 of FIG. 19 corresponds to the operation S1120 of FIG. 17, a detailed description of the operations S1310 and S1320 will be omitted.

The image display apparatus 100 may change properties of an item according to a location of a cursor in the item in operation S1330.

Based on a location of the cursor in a first item (highlighted item, Fovea) the image display apparatus 100 may set a third virtual area. Also, the image display apparatus 100 may gradually change properties of the first item according to a ratio between a size of the third virtual area and a size of the first item.

The image display apparatus 100 may change a size of an item, may increase or decrease a size of content (e.g., an image or text) displayed on the item, or may change an opacity, a color, or a location of the content displayed on the item. For example, the image display apparatus 100 may increase a size of content displayed on the first item as the ratio between the size of the third virtual area and the size of the first item decreases, and decrease the size of the content displayed on the first item as the ratio between the size of the third virtual area and the size of the first item increases.

The image display methods according to the exemplary embodiments may be implemented through program instructions that are executable via various computer devices and recorded in computer-readable recording media. The computer-readable recording media may include program instructions, data files, data structures or a combination thereof. The program instructions may be specifically designed for the exemplary embodiments or be well-known to one of ordinary skill in the art of computer software. Examples of the computer-readable recording media include magnetic media (e.g., hard disks, floppy disks, or magnetic tapes), optical media (e.g., CD-ROMs or DVDs), magneto-optical media (e.g., floptical disks), and hardware devices specifically designed to store and execute the program instructions (e.g., ROM or RAM). Examples of the program instructions include not only machine codes that are made by compliers but also computer-executable high level language codes that may be executed by using an interpreter.

While one or more exemplary embodiments have been described with reference to the figures and certain exemplary embodiments, it will be understood by those of ordinary skill in the art that various changes in form and details may be made therein without departing from the spirit and scope as defined by the following claims.

What is claimed is:

1. An image display method comprising:
    displaying, on a display, an item list that includes items and a cursor that indicates a location of a user input on the display;
    detecting the user input for moving the cursor;
    moving the cursor on the display in response to the detected user input, and determining a parameter indicating an overlapping extent of a first virtual area set with respect to the cursor and a second virtual area set with respect to an item among the items; and
    changing a size of content displayed in the item among the items according to the determined parameter while maintaining sizes of the items displayed on the display, and
    wherein the overlapping extent indicates an extent of overlapping between the first virtual area and the second virtual area, and
    wherein the size of content displayed in the item is changed based on the overlapping extent in response to the cursor moving within the item displayed on the display, the size of the second virtual area being smaller than the size of the item.

2. The image display method of claim 1, wherein the changing of the size of content displayed in the item comprises gradually changing the size of content displayed in the item according to the determined parameter.

3. The image display method of claim 1, wherein the first virtual area is determined based on respective sizes of virtual areas that are set with respect to the items.

4. The image display method of claim 1, wherein the second virtual area is determined based on a size of the item.

5. The image display method of claim 1, wherein the first and second virtual areas are circular or oval-shaped.

6. The image display method of claim 1, wherein the changing of the size of content displayed in the item comprises at least one selected from:
    increasing the size of content displayed in the item; and
    decreasing the size of the content displayed in the item.

7. The image display method of claim 1, wherein the changing of the size of content displayed in the item comprises:
    maximizing content displayed in the item when the cursor is located at a center of the item; and
    gradually decreasing the size of the content as the cursor is moved away from the center of the item.

8. The image display method of claim 1, wherein the changing of the size of content displayed in the item comprises:
    maximizing a size of first content displayed in a first item among the items when the cursor is located at a center of the first item;
    gradually decreasing the size of the first content and gradually increasing a size of second content displayed in a second item among the items, the second item being adjacent to the first item, as the cursor is moved from the center of the first item to a center of the second item; and
    maximizing the size of the second content when the cursor is located at the center of the second item.

9. An image display method comprising:
    displaying, on a display, an item list that includes items and a cursor that indicates a location of a user input on the display;
    detecting the user input for moving the cursor; and
    moving the cursor on a first item among the items on the display in response to the detected user input, determining a parameter indicating a ratio between a size of a virtual area set based on a location of the cursor and a size of the first item and changing a size of content displayed in the first item on which the cursor is located, among the items, according to the determined parameter while maintaining sizes of the items displayed on the display,
    wherein the size of content displayed in the first item is changed based on the ratio between the size of the virtual area and the size of the first item in response to the cursor moving within the first item displayed on the display.

10. The image display method of claim 9, wherein the changing of the size of content displayed in the first item comprises at least one selected from:
    increasing the size of content displayed in the first item; and
    decreasing the size of the content displayed in the first item.

11. The image display method of claim 9, wherein the changing of the size of content displayed in the first item comprises gradually changing the size of content displayed in the first item based on the determined parameter.

12. The image display method of claim 11, wherein the virtual area and the first item are similarly shaped.

13. The image display method of claim 11, wherein the changing of the size of content displayed in the first item comprises increasing the size of content displayed in the first item as the ratio decreases, and decreasing the size of the content displayed in the first item as the ratio increases.

14. An image display apparatus comprising:
   a sensor configured to communicate with a display configured to display an item list that includes items and a cursor that indicates a location of a user input, and detect the user input for moving the cursor;
   a processor; and
   a memory configured to store instructions executable by the processor,
   wherein the processor is configured to move the cursor on the display in response to the user input, determine a parameter indicating an overlapping extent of a first virtual area set with respect to the cursor and a second virtual area set with respect to an item among the items and change a size of content displayed in the item among the items according to the determined parameter while maintaining sizes of the items displayed on the display, wherein the overlapping extent indicates an extent of overlapping between the first virtual area and the second virtual area, and
   wherein the processor is configured to change the size of content displayed in the item based on the overlapping extent in response to the cursor moving within the item displayed on the display, the size of the second virtual area being smaller than the size of the item.

15. The image display apparatus of claim 14, wherein the processor is configured to gradually change the size of content displayed in the item according to the determined parameter.

16. The image display apparatus of claim 14, wherein the first virtual area is determined based on respective sizes of virtual areas that are set with respect to the items.

17. The image display apparatus of claim 14, wherein the second virtual area is determined based on a size of the item.

18. The image display apparatus of claim 14, wherein the first and second virtual areas are circular or oval-shaped.

19. The image display apparatus of claim 14, wherein the processor is configured to perform at least one selected from increasing the size of content displayed in the item, and decreasing the size of the content displayed in the item.

20. The image display apparatus of claim 14, wherein the processor is configured to maximize content displayed in the item when the cursor is located at a center of the item, and gradually decrease the size of the content as the cursor is moved away from the center of the item.

21. The image display apparatus of claim 14, wherein the processor is configured to maximize a size of first content displayed in a first item among the items when the cursor is located at a center of the first item, gradually decrease the size of the first content and gradually increase a size of second content displayed in a second item that is adjacent to the first item as the cursor is moved from the center of the first item to a center of the second item, and maximize the size of the second content when the cursor is located at the center of the second item.

22. An image display apparatus comprising:
   a sensor configured to communicate with a display configured to display an item list that includes items and a cursor that indicates a location of a user input, and to detect the user input for moving the cursor;
   a processor; and
   a memory configured to store instructions executable by the processor,
   wherein the processor is configured to move the cursor on a first item among the items on the display in response to the user input, determine a parameter indicating a ratio between a size of a virtual area set based on a location of the cursor and a size of the first item and change a size of content displayed in the first item on which the cursor is located, among the items, according to the determined parameter while maintaining sizes of the items displayed on the display,
   wherein the processor is configured to change the size of content displayed in the first item based on the ratio between the size of the virtual area and the size of the first item in response to the cursor moving within the first item displayed on the display.

23. The image display apparatus of claim 22, wherein the processor is configured to perform at least one selected from increasing the size of content displayed in the first item, and decreasing the size of the content displayed in the first item.

24. The image display apparatus of claim 22, wherein the processor is configured to gradually change the size of content displayed in the first item based on the determined parameter.

25. The image display apparatus of claim 24, wherein the virtual area and the first item are similarly shaped.

26. The image display apparatus of claim 24, wherein the processor is configured to increase the size of content displayed in the first item as the ratio decreases, and decrease the size of the content displayed in the first item as the ratio increases.

27. An image control apparatus, comprising:
   a sensor configured to communicate with a display configured to display an item list that includes a first item and a second item and a cursor that indicates a location of a user input, and to detect the user input for moving the cursor in relation to centers of the first item and the second item, respectively;
   a processor; and
   a memory configured to store instructions executable by the processor,
   wherein the processor is configured to determine a first parameter indicating a first overlapping extent of a virtual area of the cursor and a first virtual area of the first item and a second parameter indicating a second overlapping extent of the virtual area of the cursor and a second virtual area of the second item and simultaneously change characteristics of both the first item and the second item according to the determined first parameter and the determined second parameter while maintaining a size of the first item displayed on the display and a size of the second item displayed on the display, wherein the first overlapping extent indicates an extent of overlapping between the virtual area of the cursor and the first virtual area, and the second overlapping extent indicates an extent of overlapping between the virtual area of the cursor and the second virtual area,
   wherein a size of content displayed in the first item is changed based on the first overlapping extent in response to the cursor moving within the first item displayed on the display, the size of the first virtual area being smaller than the size of the first item.

28. The image control apparatus of claim 27, wherein the first item comprises a fixed first border, the second item comprises a fixed second border, and the characteristics comprise a zoom level of first and second images displayed within the first and second borders, respectively.

29. The image control apparatus of claim 27, wherein the first item comprises first textual information, the second item comprises second textual information, and the characteristics comprise sizes of the first and second textual information, respectively.

* * * * *